United States Patent
Pivato

(10) Patent No.: US 10,970,054 B2
(45) Date of Patent: Apr. 6, 2021

(54) PIXEL PERFECT REAL-TIME WEB APPLICATION FRAMEWORK

(71) Applicant: ICE TEA GROUP LLC, Washington, DC (US)

(72) Inventor: Gianluca Pivato, Washington, DC (US)

(73) Assignee: ICE TEA GROUP LLC, Washington, DC (US)

(*) Notice: Subject to any disclaimer, the term of this patent is extended or adjusted under 35 U.S.C. 154(b) by 0 days.

(21) Appl. No.: 16/428,884

(22) Filed: May 31, 2019

(65) Prior Publication Data
US 2019/0286427 A1    Sep. 19, 2019

Related U.S. Application Data

(62) Division of application No. 15/475,089, filed on Mar. 30, 2017, now Pat. No. 10,409,565.

(51) Int. Cl.
| | |
|---|---|
| *G06F 17/00* | (2019.01) |
| *G06F 8/38* | (2018.01) |
| *H04L 29/08* | (2006.01) |
| *H04L 29/06* | (2006.01) |
| *G06F 16/958* | (2019.01) |

(52) U.S. Cl.
CPC .............. *G06F 8/38* (2013.01); *G06F 16/958* (2019.01); *H04L 65/1023* (2013.01); *H04L 67/1095* (2013.01); *H04L 67/142* (2013.01); *H04L 67/327* (2013.01); *H04L 67/02* (2013.01)

(58) Field of Classification Search
CPC ...... G06F 17/2247; G06F 8/38; G06F 16/958; G06F 40/166
USPC ................................. 715/234, 200
See application file for complete search history.

(56) References Cited

U.S. PATENT DOCUMENTS

| | | | | |
|---|---|---|---|---|
| 7,197,715 | B1* | 3/2007 | Valeria ................. | H04N 21/426 715/747 |
| 7,716,634 | B2* | 5/2010 | Ross ....................... | G06F 9/453 717/106 |
| 8,458,612 | B2* | 6/2013 | Chatterjee ........... | G06F 3/04817 715/779 |
| 9,639,621 | B2* | 5/2017 | Law-How-Hung ......................... | G06F 3/0482 |
| 10,289,675 | B1* | 5/2019 | Law-How-Hung ......................... | G06F 3/0482 |
| 10,409,565 | B2 | 9/2019 | Pivato | |
| 2002/0066073 | A1* | 5/2002 | Lienhard ................... | G06F 8/34 717/105 |
| 2003/0233631 | A1* | 12/2003 | Curry ....................... | G06F 8/20 717/100 |

(Continued)

OTHER PUBLICATIONS

J.S. Foundation, Themes and Theming, published Oct. 18, 2018 via Wayback Machine, pp. 1-9 (pdf).*

(Continued)

*Primary Examiner* — Manglesh M Patel
(74) *Attorney, Agent, or Firm* — Steinfl + Bruno, LLP

(57) ABSTRACT

A system and methods for a real-time web application framework including a server controlled real-time web application with synchronized server components mapped to client widgets, a method for modal execution support in a real-time web application environment, a pixel perfect designer having a designer, an image renderer, and server components, the image renderer configured to render a client widget based on the properties of a server component, and a theming system implemented by the real-time web application during run-time.

5 Claims, 20 Drawing Sheets

(56) References Cited

U.S. PATENT DOCUMENTS

| | | | | |
|---|---|---|---|---|
| 2004/0111673 | A1* | 6/2004 | Bowman | G06F 9/451 715/234 |
| 2004/0117759 | A1* | 6/2004 | Rippert, Jr. | G06F 8/20 717/100 |
| 2004/0123238 | A1* | 6/2004 | Hefetz | G06F 9/451 715/234 |
| 2004/0268228 | A1* | 12/2004 | Croney | G06F 16/958 715/255 |
| 2006/0005165 | A1* | 1/2006 | Alabi | G06F 9/451 717/113 |
| 2010/0199185 | A1* | 8/2010 | Greenberg | G06F 16/957 715/733 |
| 2010/0333037 | A1* | 12/2010 | Pavlovski | G06F 3/0481 715/848 |
| 2011/0119618 | A1* | 5/2011 | Nestler | G06F 8/20 715/781 |
| 2011/0167403 | A1* | 7/2011 | French | G06F 8/38 717/105 |
| 2012/0047425 | A1* | 2/2012 | Ahmed | G06F 40/174 715/234 |
| 2013/0031468 | A1* | 1/2013 | Lee | G06F 8/38 715/236 |
| 2013/0246944 | A1* | 9/2013 | Pandiyan | H04L 41/22 715/760 |
| 2015/0058744 | A1* | 2/2015 | Dhingra | G06F 9/451 715/747 |
| 2015/0149891 | A1* | 5/2015 | Magistrado | G06F 3/0482 715/235 |
| 2015/0186132 | A1* | 7/2015 | Oliveri | G06F 8/34 717/120 |
| 2015/0264423 | A1* | 9/2015 | Torgemane | G06F 8/38 715/719 |
| 2016/0070813 | A1* | 3/2016 | Unter Ecker | G06F 16/958 715/234 |
| 2017/0039180 | A1* | 2/2017 | Pruitt | G06F 8/20 |
| 2018/0285328 | A1 | 10/2018 | Pivato | |
| 2019/0317738 | A1 | 10/2019 | Pivato | |
| 2019/0354353 | A1 | 11/2019 | Pivato | |
| 2021/0027010 | A1* | 1/2021 | Chitale | G06F 16/9566 |

OTHER PUBLICATIONS

Non-Final Office Action for U.S. Appl. No. 16/428,912, filed May 31, 2019 on behalf of Ice Tea Group LLC. dated Jun. 26, 2020. 11 pages.

* cited by examiner

PIXEL PERFECT REAL-TIME WEB APPLICATION FRAMEWORK

CROSS REFERENCE TO RELATED APPLICATION

The present application is a Divisional of U.S. patent application Ser. No. 15/475,089 filed on Mar. 30, 2017, the disclosure of which is incorporated herein by reference in their entirety.

BACKGROUND

Fundamentally, there are two ways to build web applications. One approach is to build HTML pages by assembling together HTML text and sending the resulting text back to the client browser for rendering. The second approach, known as the Single Page Application (SPA) uses JavaScript code running on the client browser to manipulate the Document Object Model (DOM) directly in the browser. The current application improves upon the SPA model.

The majority of existing web application frameworks in the SPA space work entirely on the client side (for example, Client-only Ajax) and provide little support for the server side, leaving the implementation of the server logic to various server side technologies designed for the HTML approach.

Existing user interface libraries, or JavaScript User Interface libraries (for example: jQueryUI, Sencha ExtJS, Telerik KendoUI, ComponentOne Wijmo, Dojo, Qooxdoo, and others) are directed towards the creation and manipulation of the widgets in the client's browser. The lack of widget support (state logic, event handling, tracking and updating properties) on the server requires software developers to write the bulk of their application code in JavaScript and for the client's browser, which can be repetitive and time-consuming.

For example, a web application as shown in FIG. 1 takes as input from a user a social security number and a retirement date, and then calculates the monthly benefits at the specified date. The server executes the logic and calculations, which can involve external services provided by other systems. For example, the server can access an external database to cross reference the social security number to decide what benefits are available to the individual. The server can also access another external lookup table to cross reference how much the individual is entitled to based on date and the type of benefits the individual is allowed. Finally, the server can perform internal calculations to verify that the calculated monthly benefits make sense and are not out of bounds.

The developer would write code for the client: two input text fields 002, button 004, event handling logic for a button press, and updating of the output text field 006. Next, the developer would write code on the server: to detect the request name and route to the handler, to read and validate the arguments, to service/handle the input data (e.g. a routine to calculate the benefits based on an input SSN and Date from the client), to manage errors, and to format the response.

Table 1 shows an example of code (in pseudocode) that a developer generally writes on the client-side, to implement the simple web application shown in FIG. 1:

TABLE 1

```
var textBoxSSN = new TextBoxWidget({
    placeholder: "Enter your SSN"
});
var textboxDate = new TextBoxWidget({
    placeholder: "Enter the retirement date (MM/YYYY)"
});
var submitButton = new ButtonWidget({
    text: "CALCULATE BENEFITS",
    clickHandler: submitButton_onClick
});
function submitButton_onClick( ) {
    AjaxRequest.send({
        serviceName: "calculateBenefits",
        serviceArgs:[
            "SSN=" + textBoxSSN.getValue( ),
            "Date=" + textBoxDate.getValue( )
        ],
        result: calculateBenefits_onResult;
    }
}
function calculateBenefits_onResult(data) {
    // code to display the result, or error messages, to the user.
    // code to check and display potential errors is omitted for simplicity.
    this.labelPayment.setValue(data.monthlyPayment);
}
```

The pseudocode in Table 1 is simplified, as it does not account for other client side code such as: 1) validation, 2) formatting, 3) adding the controls to a form on the page, 4) managing the layout of the widgets, 5) displaying feedback to the user while the server is processing the request, 6) saving display and state information for browser refresh, or 7) displaying the result or an error message.

Similarly, the simplified service definition to calculate the benefits, can be written like this:

TABLE 2

```
public void calculateBenefitsService(HttpContext context) {
    string ssn = context.Request["SSN"];
    string date = DateTime.Parse(context.Request["Date"]);
    double amount = PerformBenefitsCalculation(ssn, date);
    context.Response.Write(amount);
}
```

The code snippet in Table 2 above ignores additional "plumbing" code on the server side, such as: 1) detecting the request name and route it to the handler, 2) reading and validating the arguments, 3) managing errors, or 4) formatting the response.

In comparing this simple web application of FIG. 1, only having 2 input fields and 1 button, to a real life line of business (LOB) application with hundreds of input fields, dozens of buttons and actions on the same page, data requests and field updates that need to occur at any time, nested lookups and data entering (e.g.. search or add a customer while filling a complex form without leaving the form), it becomes apparent that the currently available web application technologies require developers to write enormous amounts of code to manage the layout, data entering, validation, service requests, response handling, User Interface (UI) updates, state management, security and authentication, nested workflow, and more.

This disclosure provides a system of managing a client and server that are in live sync with each other, without requiring any additional coding, and allows developers and designers to build user interfaces of any visual complexity.

The example application in FIG. 1 created using the methods of this disclosure allows the developer to write only the code that focuses on the actual problem, calculating the benefits. Everything else is managed by the framework: middleware that implements the methods and techniques discussed herein.

The code in Table 3 below (in pseudo-code) is all that a developer would be required to write for an application under the disclosed method. The code runs entirely on the server and interacts with the server-side representation of the client-side widgets. The middleware, running on the client and in the server, marshals any changes and inputs in the browser to the server, performs any action request by the user (e.g. button click), and updates the client in real-time.

TABLE 3

```
private void calculateButton_Click( ) {
    string ssn = this.textBoxSSN.Text;
    string date = this.datePickerDate.Value;
    double amount = PerformBenefitsCalculation(ssn, date);
    this.labelPayment.Text = amount.ToString( );
}
```

Furthermore, with regard to modal execution, web applications built with existing technologies emulate modal execution only on the client side. This requires the code flow to save the state, exit, and then resume later in response to user actions. The result is a limited and cumbersome architecture that is prone to errors and difficult to manage. Moreover, the field is lacking in a standard way to handle modal workflows and all the techniques implemented in the various web application frameworks deal only with the UI aspect of the modal state.

SUMMARY

The present disclosure provides a framework for a real-time web application, the framework including methods and implementations of a real-time web application, middleware for syncing and management of client widgets and server components, the real-time web application capable of server controlled modal execution, a theming system, and pixel perfect development.

The framework provides middleware to perform syncing of client and server components during runtime, therefore allowing developers to focus primarily on the application development, rather than keeping the server updated of client states. The middleware performs modal execution on the server rather than client, which allows for improved state logic maintenance.

The theming system is defined in a single file and may be interpreted during runtime, allowing for dynamic interactions between the code and themes. The theming structure provides greater flexibility in allowing developers to define themed properties among widgets.

Pixel perfect development utilizes image renderers and components with properties that define run-time widgets to render images of the widgets during design time, the images being the same as those that would be rendered during run time.

In one aspect of the disclosure, a method of providing a real-time web application is described, comprising: mapping one or more server components to a plurality of corresponding client widgets, and synchronizing, with a middleware, each of the server components with the corresponding client widget.

In another aspect of the disclosure, mapping the one or more server components is described, comprising: providing within the one or more server components, a map between properties of the components and properties of the corresponding client widgets, resulting in mapped properties wherein the mapped properties of each server component include a unique identifier and a class name of the corresponding client widget.

In another aspect of the disclosure, a method of generating and displaying pixel perfect representations of web application controls in design-mode is described, comprising: storing, in computer memory, at least one control having at least one graphical component; storing, in computer memory, at least one image renderer, wherein the at least one image renderer is a rendering engine capable of rendering marked up content; configuring the at least one image renderer to receive a defined set of properties and render a digital image based upon the defined set of properties; storing, in computer memory, at least one designer capable of designing a web application, the at least one designer having a display area configured to display a graphical representation of the web application; defining properties within the at least one control, the properties enabling the at least one image renderer to render a corresponding image file based on the properties; and configuring the at least one designer to call the image renderer, in design-mode and without running the web application, to generate at least one digital image of the at least one graphical component of the at least one control.

In another aspect of the disclosure, a method of synchronizing each of the server components with the corresponding client widget is described, including: receiving and processing, by a server, a state and event request message, the message comprising: state data of the client widgets, wherein the state data contains differential state data of each client widget running in the application, the differential state data reflecting changes occurred in each of the client widgets since a previous state and event message, and event data, wherein the event data includes a collection of triggered registered events, the client's pointer location, key code state, widget-specific data, and event specific data; and updating, in memory, the server components based on the differential state data of each of the corresponding client widgets; dispatching each triggered registered event to a corresponding server component, the server component corresponding to the client widget in which the registered event was triggered; processing and executing application specific instructions in a handler, each triggered registered event having a corresponding handler; determining, based on the state data and event data, whether each of the server components must be modified, or destroyed, or a new server component must be created, resulting in a collection of dirty components; updating, in memory, the state properties of each of the client widgets, wherein the state properties represent a last known state of each of the client widgets; and preparing and sending a state and event response message, to a client, the message including updated widget definitions, and a list of instructions based on the collection of dirty components, the list instructing the client to modify or destroy existing client widgets or create new client widgets, wherein the message is formatted in JSON format and the client does not change appearance of the web application unless instructed to by the server.

In another aspect of the disclosure, a method of performing modal execution in a real-time web application is described, wherein the state and event message further comprises instructions to begin modal execution, and the receiving and processing, by the server, further comprises: creating, by the server, a first thread to process the state and event request message; pausing, by the first thread, the processing and execution of the application specific instructions at the point where a modal event instruction is encountered; creating and activating, by the first thread, a modal server component; adding to the state and event response message, instructions to create a modal client widget, the modal client widget corresponding to the modal server component; suspending execution and waiting, by the first thread, for the modal server component to be deactivated; creating, by the server, an additional thread to receive and process an additional state and event request message, upon receipt of the additional state and event request message, the additional message including instructions to end modal execution; deactivating, by the additional thread, the modal server component, resulting in a release of the first thread; suspending execution and waiting, by the additional thread, for the modal component to become unlocked; waking and locking, by the first thread, the modal component; resuming, by the first thread, the processing and executing application specific instructions at the point where the first thread was previously paused; unlocking, by the first thread, the modal component, resulting in the release of the additional thread; and updating and sending, by the additional thread, a subsequent state and event response message, the subsequent message including instructions to terminate the modal widget.

In another aspect of the disclosure, a method of providing a dynamic, customizable theming system for a web application is described, comprising: creating a theme file, the theme file being a single file and not multiple combined files, in JSON format; defining in the theme file, a theme name, settings, fonts, colors, images and appearances; and converting the theme file into a JavaScript dynamic code that is executed by a client during run-time of the application; wherein: the settings comprises general system and application specific information including whether or not scrollbars will be displayed and frame padding widths, the fonts comprises an indirection map, mapping differently named fonts to sets of font information, the font information including font type, font size, bold, italic, and URL source information, the colors comprises an indirection map, mapping named colors to specific colors that the client may use to draw the named colors, the images defines named images that can be reused in the theme file or web application, mapping named images to defined image sources, the appearances define styles and properties grouped by key names and states, each key name capable of reuse by the application or widget to determine which styles or properties to use in relation to a state or combination of states, the styles being values that apply to entire widgets using a CSS class system, properties being values that are assigned to a widget property with the same name and capable of being overridden in a specific widget instance, and each appearance of the appearances is capable of being a parent appearance, the parent appearance containing child appearances, the child appearances limited in scope to the child widgets of a widget using the parent appearance.

DETAILED DESCRIPTION

Figure 1:
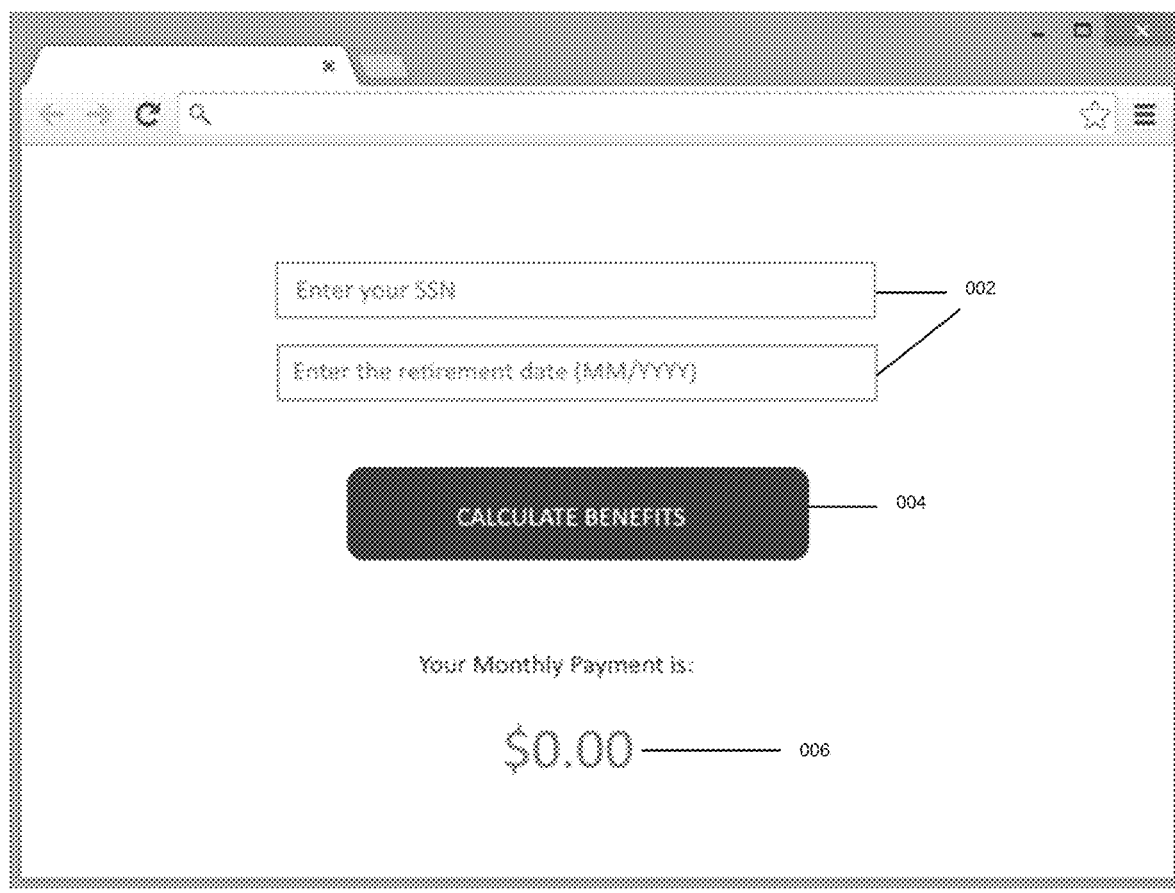
FIG. 1 shows an example of a web application with typical fields.

The present disclosure provides a system and methods for real-time web applications and pixel perfect development. The present disclosure relates to a system for a server computing device, the device can have, for example, a Windows operating system, and a .NET framework. The present disclosure further relates to a client computing device, the client can have a modern browser, capable of running or interpreting a client-side software language, for example, JavaScript. The client and server can be networked together, for example, through a TCP/IP network connection.

The term "widget" used herein shall be understood to mean a software element within an application, or more specifically, a web application, that can have a graphical user interface (GUI) representation and display information or provide a specific way for a user to interact with the application. It can also specifically be, for example, a JavaScript object that represents itself on the browser by managing the Document Object Model (DOM) directly.

The term "middleware" used herein, shall be understood to generally mean software that acts as a bridge between an operating system or database and applications, especially on a network. More particularly, middleware may refer to the Communication and Component Management System that manages the communication between the server components and their corresponding client widgets. The middleware layer can run on both the server and client. It can be in charge of updating the client, updating the server, dispatching events, collecting changes, managing the state and lifetime of the components and widgets. The framework can run self-hosted, or use existing technology, for example, Microsoft's Internet Information Server (IIS),FastCGI, Owin, Apache Mods, and others.

The term "component" used herein, shall be understood to mean a highly reusable software element within an application, or more specifically, a web application, that can have both a presentation or visual aspect and a logical aspect.

A computing device is an electronic device having one or more central processing units (CPUs). Computing devices include, but are not limited to, personal computers, embedded electronic devices, mobile phones, smartphones, and tablets.

The term "server" used herein, shall be understood to mean a computing device, or a computer program executed on a computing device, that provides functionality, information, or applications for other programs or computing devices called "clients." The term "client" used herein shall be understood to mean a computing device or a program executed on a computing device (for example, a browser) capable of obtaining functionality, information, and applications from a server.

It can be noted that the server and client can be programs running on different computing devices, in which case the term server is synonymous with the computing device executing the server program, while the term client is synonymous with the computing device executing the client program. However, both the server and client can also be programs running on the same computer, in which case the term "server" is used to describe the server program and its dedicated resources and the term "client" shall mean the client program and its dedicated resources.

The term "framework" shall be understood to mean a software environment that provides particular functionality as part of a larger software platform to facilitate development of software applications, products and solutions. Software frameworks can include support programs, compilers, code libraries, tool sets, and application programming interfaces (APIs) that bring together all the different components to enable development of a project or system. Framework can refer specifically to the methods, systems, and techniques described herein that support the development and execution of an application. For example, framework can be used to refer to the middleware, the messaging between the client and server, the widgets and components, the theming system, and the development environment.

The term "listen" used herein, shall be understood to mean to periodically check the status of, or to be configured to know when status has changed or to otherwise know and be conditioned on the status of an element.

The term "asynchronous" used herein, shall be understood to being capable of performing tasks independently.

The term "event" as used herein, shall be understood to mean an event, for example, a button click or a mouse over, or a pressed keystroke, that a web application listens for and performs activities based on.

The term "session" as used herein, shall be understood to mean the application instance assigned to a specific user (for example, the client) by a server. The session can contain all objects (controls, application data, and more) that are created and managed for a client browser. More broadly construed, "session" can be understood to mean an interaction between two endpoints, for example, a client and a server. The "interaction" between the two endpoints may be a "request" from the client and a "response" from a server.

The term "socket" as used herein, shall be understood to mean a network socket. The network socket is an endpoint for sending or receiving data at a single node in a computer network. It is a representation of the endpoint in the networking software, which can be viewed as a protocol stack.

The term "duplex" or "full duplex" as used herein, shall be understood to refer to the transmission of data in two directions simultaneously.

The term "WebSocket" or "WebSocket mode" or "WebSocket connection" shall be understood to refer to a direct connection between the browser and the server allowing bidirectional communications. The server can update the browser at any time and vice versa. For comparison, when in HTTP mode, only the client can initiate a request and the server can only respond.

The term "application" as used herein, shall be understood to mean grouped instructions capable of being executed by a computing device that provides a specific task or set of tasks.

The term "web application" as used herein, shall be understood to mean a software application that runs on both a client (for example, in the form of a web browser) and a server. Unless otherwise indicated, an "application" shall be understood to refer to a "web application."

The term "theme" or "theming system" shall be understood to mean grouping, defining, organizing and mapping of visual and graphical properties shared among elements of an application (for example, text fields, buttons, menus, and other elements), the properties can include, for example, fonts, colors, border thicknesses, images, and more.

Modular System Description for a Real-Time Web Application

Figure 2:
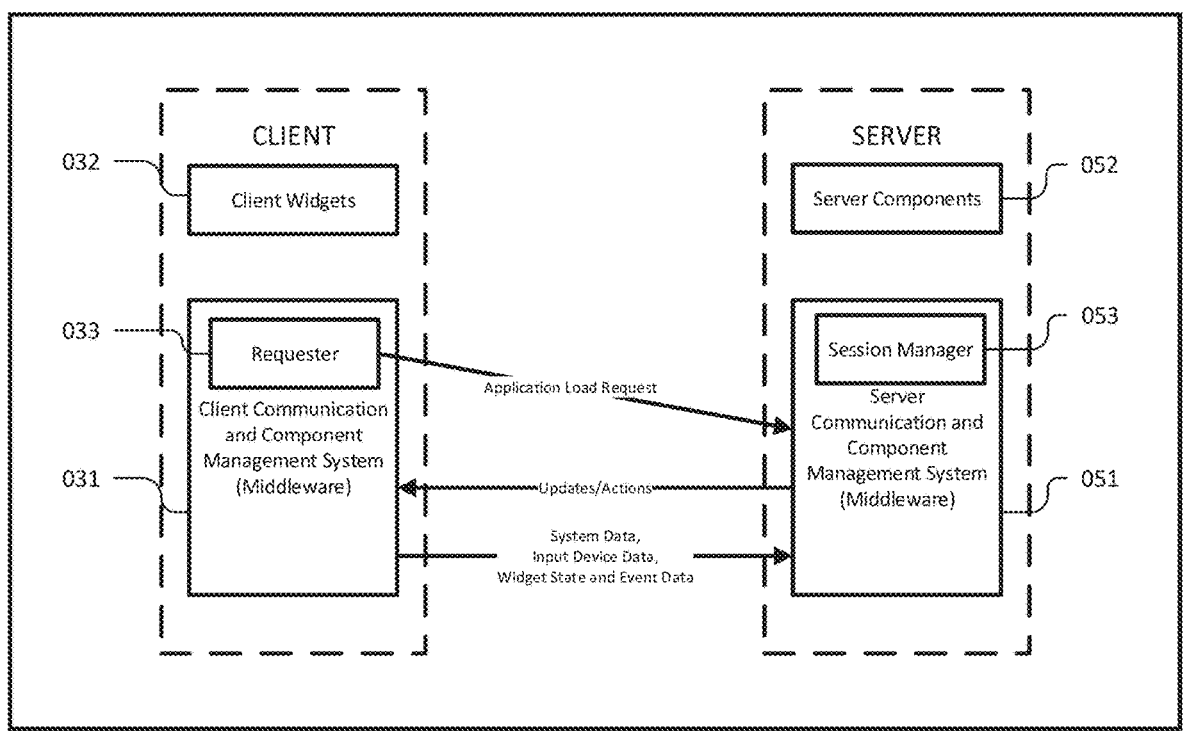
FIG. 2 shows an embodiment of a modular description of real-time web application implementation on the client and server.

FIG. 2 shows a server and a client configured to perform the methods disclosed herein. The server can have a plurality of server components 052 (for example, .NET Components). Each server component 052 can have a corresponding client widget 032 (for example, JavaScript Widgets). The server components 052 and the client widgets 032 can be mapped to each other by a table, a database, or through properties belonging to the server component 052. For example, the server component for a button can have a designation "Wisej.Web.Button." When the server, based on the web-application requirements, creates an instance of "Wisej.Web.Button" component, the server instructs the client to create the corresponding client widget "wisej.web.Button."

In a specific embodiment, a server component named "Wisej.Web.Button," can be developed to contain a property, stored in memory that references the corresponding client widget named "wisej.web.Button." The server component can also contain a method, for example a rendering method that maps the server component to a corresponding client widget. See Table 4, for example:

TABLE 4

```
protected override void OnWebRender(dynamic config)
{
    config.className = "wisej.web.Button";
    config.width = this.Width;
    config.Text = this.Text;
    ....
}
```

Each component can contain property values, these property values belonging to the corresponding client. During runtime, the server can send the mapped properties to the client to initialize or update the client widgets. Regarding the pixel perfect designer aspect of the current disclosure, mapped property values of the component can be sent to a renderer every time the designer determines a need to draw or redraw the widget.

In both the run-time and design-time cases, the properties can be sent the first time the widget is created on the client, subsequent updates can contain only the values that have changed since the last update. However, it is contemplated that all the values can be sent with every update, regardless of whether or not it has changed since the last update.

The server can have a component manager middleware, for example, a server Communication and Component Management System 051, configured to store the state of each component 052, compute changes that occur in each component 052 based on changes in client widgets 033, and update the state of each component 052.

Figure 3:
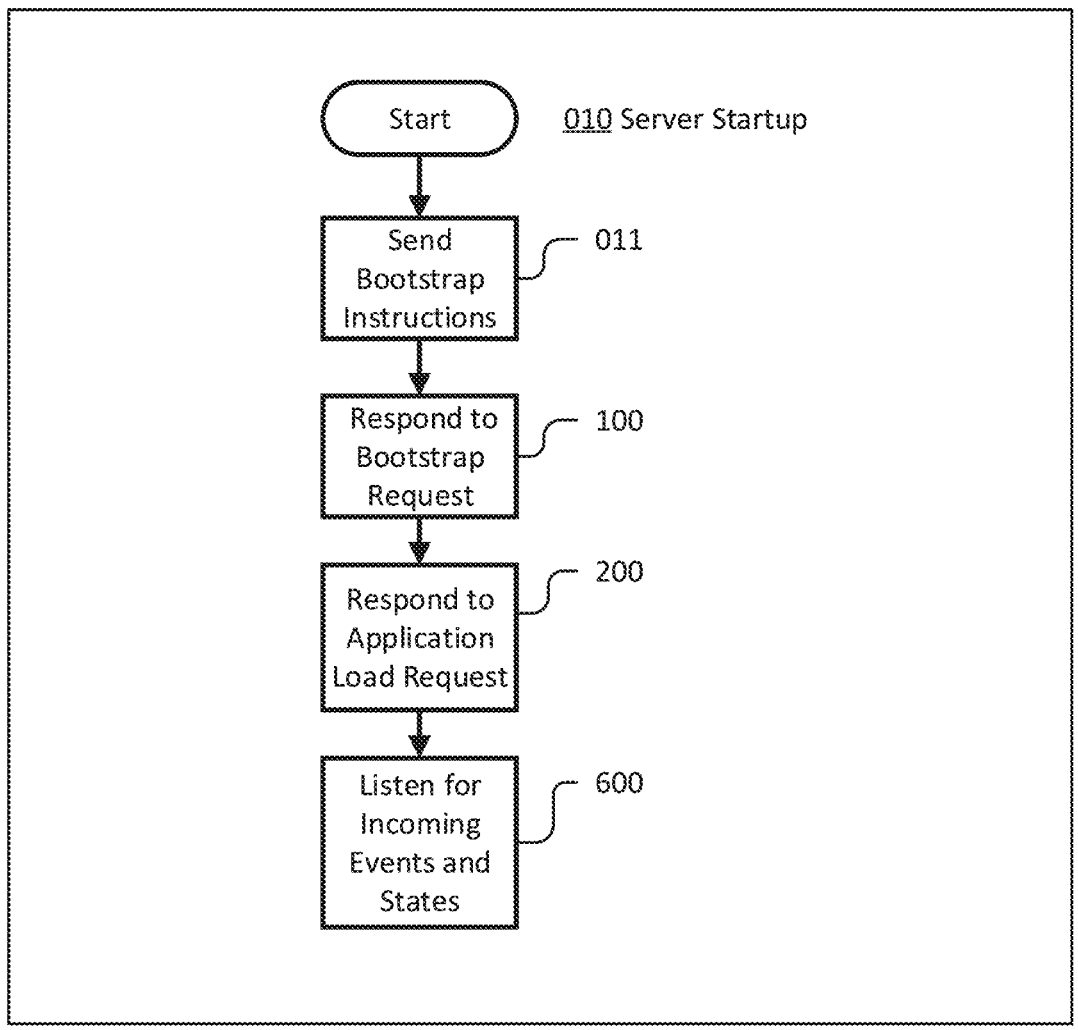
FIG. 3 shows an embodiment of a server start up routine with regard to real-time web application implementation.

The server middleware 051 can be configured to receive and process event requests from the client, including determining the type of request received, processing all event and event data, and dispatching each event to the corresponding component 054 and corresponding event handlers. Referring to FIG. 3, the server middleware may perform the method steps of Send Bootstrap Instructions 011, Respond to Bootstrap Request 100, Respond to Application Load Request 200, and Listen for Incoming Events and States 600, including the sub-methods contained therein.

The server middleware 051 can be built upon a known web server technology, for example, Microsoft's Internet Information Server (IIS), however the web server technology is irrelevant since the middleware can use other web communication systems (for example, FastCGI, Owin, Apache Mods) or the middleware techniques can be implemented in a self-hosted server.

The server can also have a session manager 053 configured to determine whether a client load request was sent by a new session (i.e. new instance of a web application) or an existing session (i.e. existing instance of the application, the load request possibly based on a browser refresh). If the load request is based on an existing session, the session manager 053 validates the session to minimize session spoofing. The session manager can be a part of the server middleware 051.

The client, as shown in FIG. 2, can have client middleware 031 (for example, a client Communication and Component Management System), client widgets 032, and a requester 033. The client middleware 031 may perform methods described in FIG. 8, for example, the client middleware 031 may Load Resources 021, Send Application Load Request 022, Receive and Parse Application Load Response 023, Create Client Widgets in Browser 024, Listen for Events from Widgets 300, and Listen for Updates from Server 400.

A requester 033 may be a part of the client middleware 031 that sends requests to the server.

The client middleware 031 can listen for events 300, attach handlers to registered events on all widgets 301, such that when an event is triggered (for example, by a user pressing a button), middleware 031 can asynchronously process and send queued events 302.

Each client widget 032, for example, a JavaScript Widget, can correspond to a server component 052. Each client widget 033 can have, as properties, events. The server can register to each of these events, the server middleware 051 managing which events are registered for and communicating this information to the client via the client middleware 031. The client middleware 031 can process updates from the server middleware 051 by maintaining differential widgets state data, or creating, updating, or destroying widgets as instructed by the server.

Implementation of Methods by a Server for Real-Time Web Applications

Figure 19:
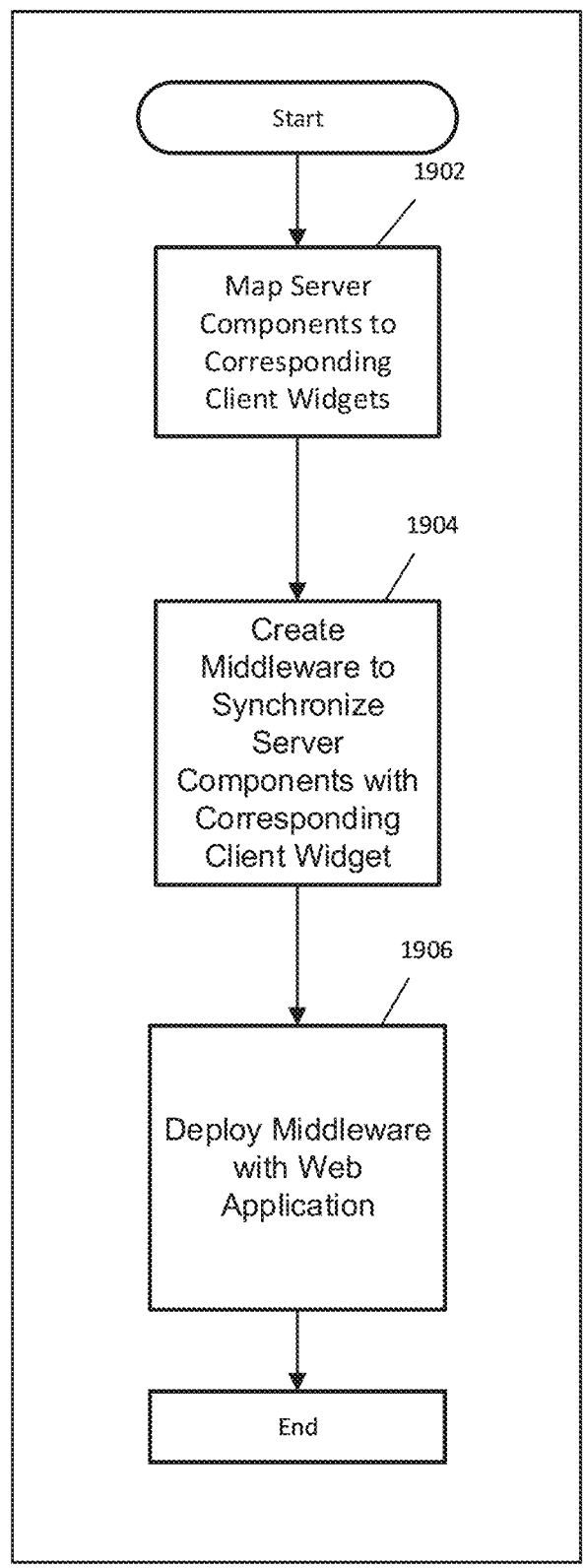
FIG. 19 shows an embodiment of implementation of real-time web application framework through mapped components and middleware.

As shown in FIG. 19, the implementation includes Map Server Components to Corresponding Client Widgets 1902. Each server component can have an external map to corresponding client widgets, or an internal map to corresponding client widgets. An internal map can be implemented by storing properties in the component that are publicly accessible, the properties can include a unique identifier to the corresponding widget, a class name, visual properties such as size (width, height, etc), color, text, x-y coordinates, and more. The mapping can be made at the time the component class is developed, or after the component class is developed. The mapping may reside in a single method. During run-time, all the properties can be sent by the server to create the corresponding widget on the client, subsequent updates sent by the server can contain only the values that have changes since a previous update.

The implementation further includes Create Middleware to Synchronize Server Components with Corresponding Client Widget 1904. The middleware being on the client and server, and configured to perform the syncing methods described in detail herein.

The implementation further includes Deploy Middleware with Web Application 1906. The middleware is automatically deployed with each web application automatically to the client and server prior to run-time to support synchronization of the client widgets and server components. For example, when the browser requests the starting HTML page, the server may send back the bootstrap code, which in instructs the client to request the libraries (e.g. JavaScript libraries) that compose the client widgets and client middleware. All the libraries may be embedded resources in the server side code and are extracted and sent back to the client/browser when the application is loaded to simplify the deployment of the web application to just binary files.

The server startup 010 shown FIG. 3 shows a startup routine that is initiated, for example, when a user opens a browser and attempts to load a web application using the disclosed framework. The server is configured to Send Bootstrap Instructions 011 to a client, for example, by embedding a bootstrap script into an html file that is consumed by the client browser. The bootstrap script can instruct the client to send the server the client's browser type and capabilities, system information, application information, and a request for resources, for example JavaScript resources.

Figure 4:
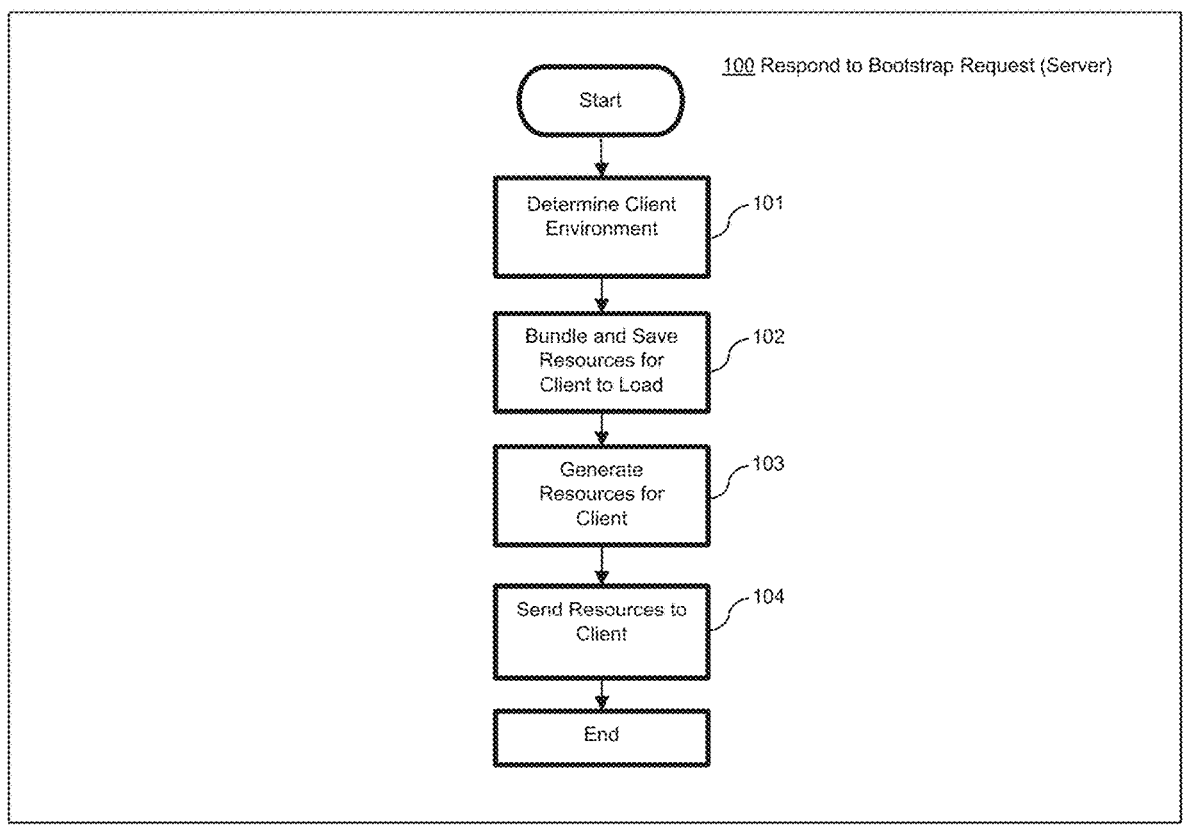
FIG. 4 shows an embodiment of methods of a server responding to a bootstrap request with regard to real-time web application implementation.

After the client sends the server the request for resources, the server can Respond to Bootstrap request 100 as shown in FIG. 3 and, in greater detail, in FIG. 4. The server can be configured to Determine Client Environment 101, for example, by determining what the operating system of the client, the browser type and capabilities, and system resources and application specific resources that a client requires, based on the data in the bootstrap request. The "bootstrap request" can also be referred to as a request for resources.

The server can Bundle and Save Resources for Client to Load 102 by packing the determined resources into files, the files to be read by the client. For example, the server can package the resources into single files, minifies and compresses and saves four versions of each file: debug, minified, debug-compressed and minified-compressed. The "debug" version may contain human readable code that can be debugged in the browser. The "minified" version may be contain the same code but with all the spaces and formatting removed, variable names shortened, and minimalizing techniques employed to make the source code smaller and more difficult to copy. The debug-compressed and minified-compressed are the same as above but precompressed, for example, by using the gzip algorithm. Saving precompressed gzipped files allows the web server to return the compressed file instead of having to perform the gzip compression on every request from each new client session.

The server can determine which of these resource files to use depending on the browser capabilities and execution mode. For example, the client middleware can send a set of information about the client browser back to the server middleware. The server middleware can detect, for example, if the client/browser supports compression, supports websocket, whether the application is in currently in debug mode, what the size of the client screen is, and the device type of the client.

The server can Generate Resources for Client 103. For example, the server can generate a list of resources, each resource provided as a URL in a JSON array:

TABLE 5

[
  "resource.wx/ Wisej.Web/qx.min.js",
  "resource.wx/wisej.js",
  "resource.wx/wisej.css",
  ...
]

The server can then Send Resources to Client 104, for example, as a response to the bootstrap or resource request, over a TCP connection, or a websocket.

Figure 5:
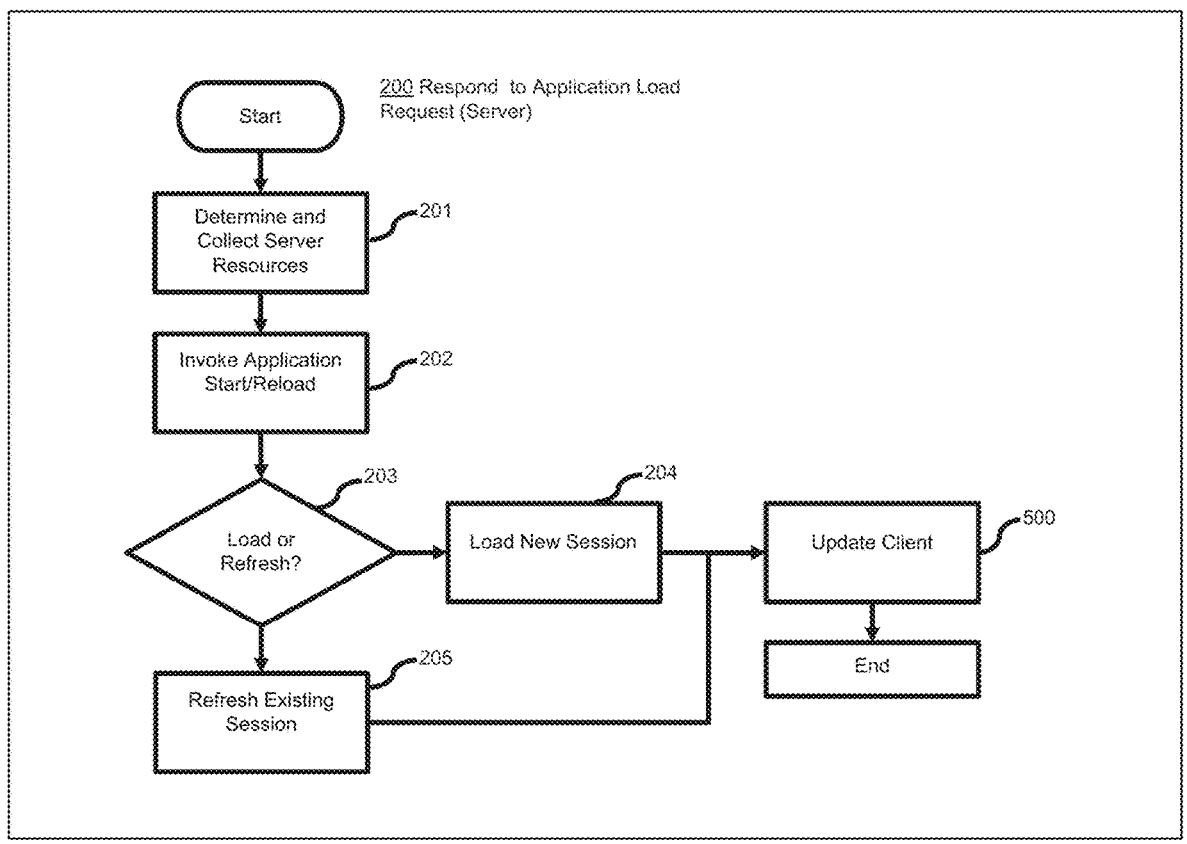
FIG. 5 shows an embodiment of a server response to a load request with regard to real-time web application implementation.

As shown in FIG. 3 and FIG. 5, the server can Respond to Application Load Request 200. The server can Determine and Collect Server Resources 201 as shown in FIG. 5. When a load request is received from the client, the server can determine and collect the required resources or libraries, for example, .NET assemblies, that contain components and functionality to support the application. The server can also determine the startup method or startup page according to a configuration of the application. For example, the "configuration" of the application can be a JSON file containing a number of properties, including the name of the startup class and entry point (entry method). The server middleware may load the specified class (the startup class) and call the entry point method, for example, by using .NET reflection.

The server can initiate a switch to duplex connection, for example, a WebSocket connection, right after the application load. The first load request/response, however, is through HTTP. A duplex connection, for example, WebSocket mode, is fundamental for the real-time web application implementation because the server may push updates to the client without requiring the client to first send a request.

The server can Invoke Application Start/Reload 202. For example, the server can determine whether the application load request is based on a new session or an existing session (Load or Refresh 203). When the load request is based on an existing session, the server can validate the session against the client's device to minimize session spoofing. The validating may include, for example, a "finger printing" technique. The server middleware may generate a hash code using the data received from the browser, such as "user agent", client IP, proxy IP. The server middleware may be configured to generate the same hash code for each subsequent request for the same session. If an intruder managed to spoof the session id, chances are that they are working from a different IP (if they are on a LAN sharing the same public IP then the intruder is connected to the same physical LAN or on the same VPN). The intruder must also use exactly the same browser and version and be on the same OS, otherwise the fingerprint hashcode would not match and the middleware would then invalidate the session.

If the session is a new session, the server can Load New Session 204, for example, the server can invoke the startup Main method (i.e. the entry point method called by the server to run an application instance) or create the main page or window as specified by the application. If the server determines that the session is an existing session, then the server can Refresh Existing Session 205 by marking every server component as "dirty" and "new." The server can use the marking information to generate instructions for the client. The instructions can define actions to recreate all the widgets that have been destroyed by the client or browser refresh, and restore the client widgets' states.

Figure 6:
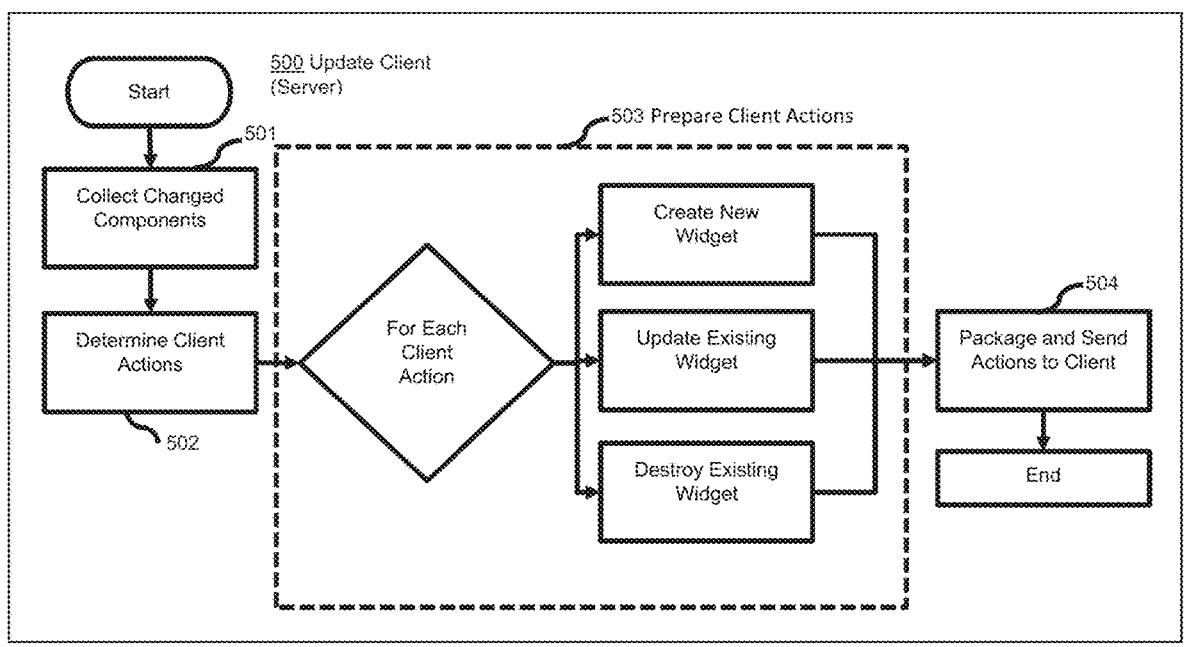
FIG. 6 shows an embodiment of a server updating a client user interface with regard to real-time web application implementation.

The server can then Update Client 500, as shown in detail in FIG. 5 and FIG. 6. To Update Client 500 as shown in FIG. 6, the server can Collect Changed Components 501, for example, by collecting the server components marked "dirty" (which identifies the components that must be created, modified, or destroyed). The server can Determine Client Actions 502 by determining the type of action to send back to the client and the data associated to the action.

The server can Prepare Client Actions 503 by packaging and formatting each action into a message. For example, for each client action, the server can serialize the action into a single JSON message. The actions can be grouped and each action can apply to several widgets, for example:

TABLE 6

[
  {"action": 1, "data": [{...}, {...}]},
  {"action": 2, "data": null,
  {"action": 3, "data": [{...}, {...}]},
  {"action": 4, null,
]

For example, when the determined action is to create a new widget, the server can serialize or package all the properties that describe the corresponding client widget and save a copy of the properties as a state baseline, and also as a last known state of the corresponding client widget.

When the determined action is to update an existing widget, the server can serialize or package all the properties that describe the widget and create a differential set of properties by subtracting the previous baseline set of properties (e.g. last known state of widget) and then update the state baseline.

When the determined action is to destroy a widget, the server can remove the component from the server storage and serialize only the widget's unique ID along with an instruction to destroy the identified corresponding client widget, for example a destroy action.

The server can Package and Send Actions to Client 504, i.e. send the serialized packaged instructions to the client over a TCP connection. The order of execution can be irrelevant; however, certain calls (e.g. custom JavaScript calls) can be executed last.

Figure 7:
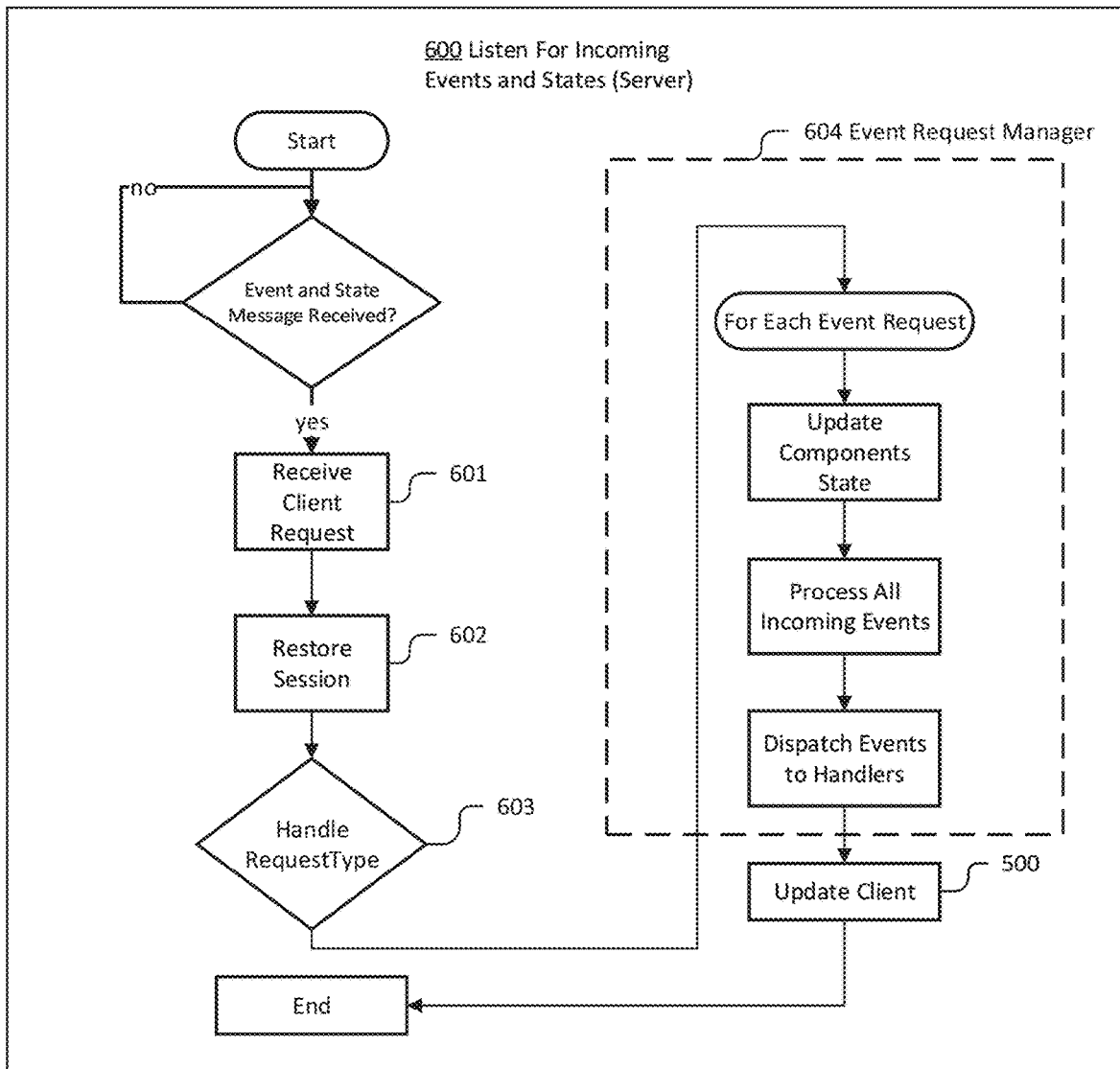
FIG. 7 shows an embodiment of a server listening for an incoming response message having events and states data.

As shown in FIG. 7, the server can Listen for Incoming Events and States 600 coming from the client. An incoming event and state message can be sent by a client, and can be in the form of a client request, or request, as described below.

An incoming event and state message can be a client request that includes one or more events, each event having corresponding data and state values for client widgets. The server can have event handlers registered to handle specific events. Some handlers can be managed by the server middleware to perform system functions, such as component layout when the browser size changes, decode and fire keyboard events, pointer events. Otherwise the event handlers can depend on the application, for example, handling a click on a button is an event handler that is application specific.

The incoming event and state message can be a result of a user triggering a registered event in the web application running on the client. The state values can be differential state values, reflecting only the changes that occurred since the state properties were previously stored, or they can reflect the current state of each and every widget, regardless of the previously stored state property.

Accordingly, the server can Receive Client Request 601, for example, by receiving all HTTP and WebSocket requests using the registered extension (e.g. extension ".wx"). The server can Restore Session 602 by parsing from the incoming events and states message, a unique session ID, and determining, based on the unique session ID, if the message relates to an existing session. The server can restore and validate the session for each message.

The server can Handle Request Type 603, for example, by determining the type of request coming in from the client. Handled request types can include: a) "resource", where the client can be asking for content such as: image, JavaScript, style sheet, etc.; b) "data", where the client can be asking for data items, for example, to populate a widget on screen; or c) "event", where the client has fired an event that the server had registered for. The events and states message can have a request type "event."

Each request can be handled by a specific manager (e.g. a module within server memory). For example, the server can have an Event Request Manager 604 to handle each event request (i.e. each events and states message). The Event Request Manager 604 can asynchronously process each event request, for example, by creating a dedicated separate execution thread or an asynchronous http handler to process each request.

The server can handle each event in the event request 604. For each event, the server can Update Component States, wherein each event can contain the differential state of all the application's widgets. The server can extract the data related to the event, for example, pointer location, key code, other widget-specific and event-specific data, and prepare the internal event objects and arguments. The internal event objects and arguments can be, for example, structures that are not publicly available to developers and are used internally to process the incoming events.

Each event, or at least each registered event (i.e. that the events that will trigger a request from a client), can have a corresponding event handler. The event handler can include a set of executable instructions associated to the particular event. The server can Process All Incoming Events, by dispatching each event to the corresponding target component and corresponding event handler, so that the thread can process each of the executable instructions of each handler. Before dispatching any event, the server may verify that the state (property values) of all the server components match the state of their client widget counterparts. Otherwise the application code handling the event may operate on the wrong data, for example the text of a data field.

After all the events have been processed, the system can collect the changes to the "dirty" components and Update Client 500 as discussed earlier. For example, each client widget can be marked dirty (added to the dirty list) by the client middleware when the value of some properties changes (the properties depend on the widget—the common ones are size, location, value but other widgets may become "dirty" when the user selects an item in a list). The server middleware marks the corresponding server components as dirty when any property that affects the functionality on the client changes and needs to be sent to the client. For example, at the end of each request the server middleware goes through the dirty list, renders the properties of each component and removes the values that have not changed using an iterative (deep) comparison.

Implementation of Methods by a Client for Real-Time Web Applications

In an embodiment the present disclosure, the client can render and create the front end of the web-application. The client, however, can only change the states of client widgets based on commands from the server. The client cannot change the appearance or state of the client widgets unless commanded so by the server.

Figure 8:
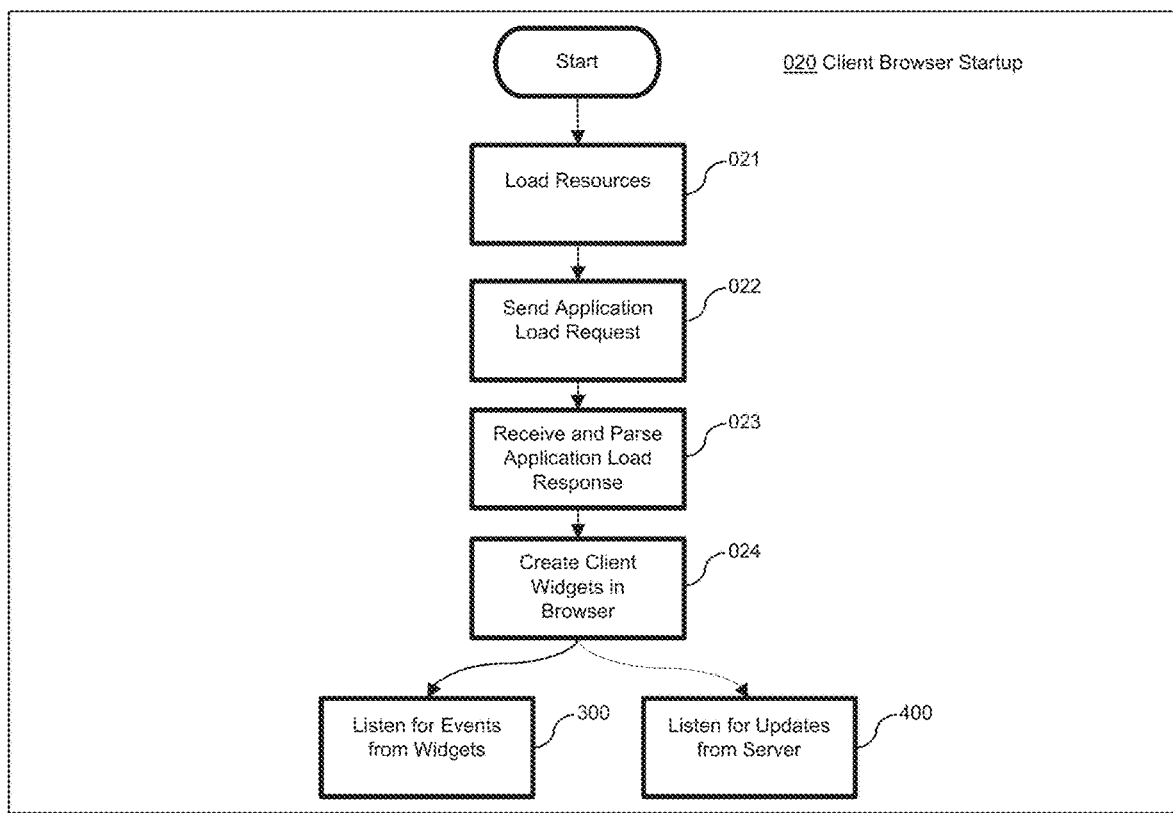
FIG. 8 shows an embodiment of a client startup.

As shown in FIG. 8, the Client Browser Startup 020 can include Load Resources 021. For example, a bootstrap script can be embedded in an html file at the web address of the web-application, such that when the client browser addresses the web-application, the client runs the bootstrap script embedded in the html, for example: <script src="wisej.wx"/>. Under the bootstrap script instructions, the client can fire a bootstrap request (i.e. a request for resources) to a server. Once the client receives the response to the bootstrap request, the client can load the resources, for example, JavaScript resources, as instructed by the response to bootstrap request. The resources can be, for example, client middleware, client widgets, relevant libraries to be included in the application or in a middleware extension. A middleware extension is a new control that is added to the middleware core control set, for example, like a plug-in.

Once the initialization of the client-side framework is complete (e.g. the client has loaded all the resources specified in the response to bootstrap request), the client can send an application load request 022, for example, in the form of an ajax request. The server can respond by sending the client a list of actions to perform, including actions to create client widgets, update existing widgets, or destroy existing widgets (as discussed earlier in FIG. 5, 200-Respond to Application Load Request, and FIG. 6, 500-Update Client).

The client can Receive and Parse Application Load Response 023 from the server. For example, the client can receive and parse the application load response from the server, which can be in the form of a JSON Response. The client can use the information in the JSON Response to generate a list of actions to execute on the client side. The client and server middleware, can start and open a duplex connection, e.g. a WebSocket connection, and start listening and pushing updates.

The client can Create Client Widgets in Browser 024 according to the definitions received in the application load response and/or the list of actions generated earlier. Each widget can be created with properties, for example:

TABLE 7

{
  "id": "id-1",
  "className": "wisej.web.Button",
  "label": "Click Me",
  "x": 10,
  "y": 10,
  "width": 80,
  "height": 24,
  "wiredEvents": ["click","move","resize",...], TABLE 7-continued

```
    ...
}
```

Figure 9:
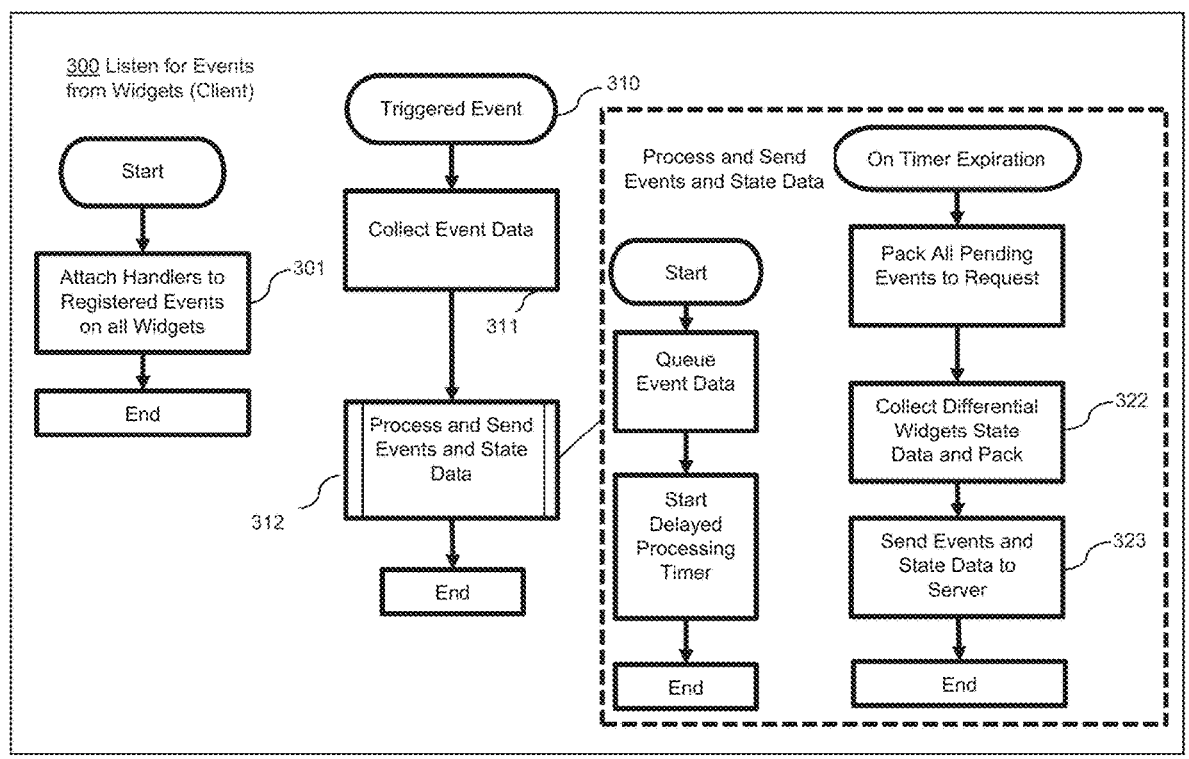
FIG. 9 shows an embodiment of a client listening for events.

As shown in FIG. 9, the client can Listen for Events from Widgets 300 by, for example, Attaching Handlers to Registered Events on All Widgets 301 to widget events. Each widget can be configured, for example in a JSON configuration, with one or more properties. Among these properties can be a list of wired events. The client can designate the wired events in correspondence to the events that the server has registered for. The client can attach event listeners specifically to each wired events, such that the client will be signaled when an event is triggered.

When a Triggered Event 310 occurs, for example, by a button press, the client can Collect Event Data 311, for example, event-specific data such as the type of event (cell click, button press, etc.), widget states and properties, pointer location, mouse button state, keyboard and wheel delta and event-specific data that can have been added to the event by the widget. The collected data may, for example, be packaged by the client in JSON format:

TABLE 8

```
{
    "type": "cellClick",
    "target": "id_1",
    "position": {
        "x";150,
        "y":200
    }
    "keyCode": 97,
    "data": {
        "role":"checkbox",
        "row":4,
        "col":3
    }
}
```

The client can Process and Send Events and State Data 312 to the server by populating a message with the collected event data and collected differential widgets state data, and sending the message to the server. In a specific embodiment, the client can asynchronously process and send the events and state data by queueing the event data. The client can then set start a delayed processing timer. The timer can be set to a short time frame, for example, 5 to 2000 milliseconds, or more preferably 20 to 100 milliseconds. After the client sets the timer, the client can then return control to the browser. Returning control means that the task of Process and Send Events and State Data 312 is done and the browser can resume performing normal tasks. The client browser interprets or executes lines of code, for example, JavaScript, as a single threaded execution, therefore, when the code is running (for example, the computer instructions for Process and Send Events and State Data 312) the application in the browser will appear frozen. In this respect, using timers to release control to the browser and then process the queued task when the browser has time to fire the timer event becomes advantageous—to shorten the freeze time in the application.

In the same embodiment, on timer expiration, the client can remove all pending events in the queue and pack them into a request message to client, for example, into a request message having type "event" (e.g. an event and state message). The message can be formatted, for example, as a single JSON data structure.

The client can collect differential widgets state data, by iterating through all the widgets that have been added to the dirty collection. These "dirty" widgets are the widgets that have changed because of a user action: a value has been typed in, resized, clicked, or otherwise changed. The client can collect the current value of the state properties, compare their value with the previously stored state properties, and produce a JSON definition containing only the differences, if any. In other words, the client middleware may go through the client dirty list and collect the properties that have changed that make up the state of each widget, remove the previous values again using a re-entrant deep loop and send to the server the differential state and events data. When the server receives the differential state and events, the server can process the state information before the server dispatches the events received to their corresponding event handlers.

Each widget can define a set of state properties according to its own functionality. For example, an input widget can define the value as a state property: e.g. when the value changes, the widget is added to the dirty collection.

The client can send events and state data to the server. For example, after collecting all the queued events and their data, and all the different state values for all the widgets in the browser, the client can fire a request, for example, an ajax request back, to the server carrying the state information and the list of events and their data.

Figure 10:
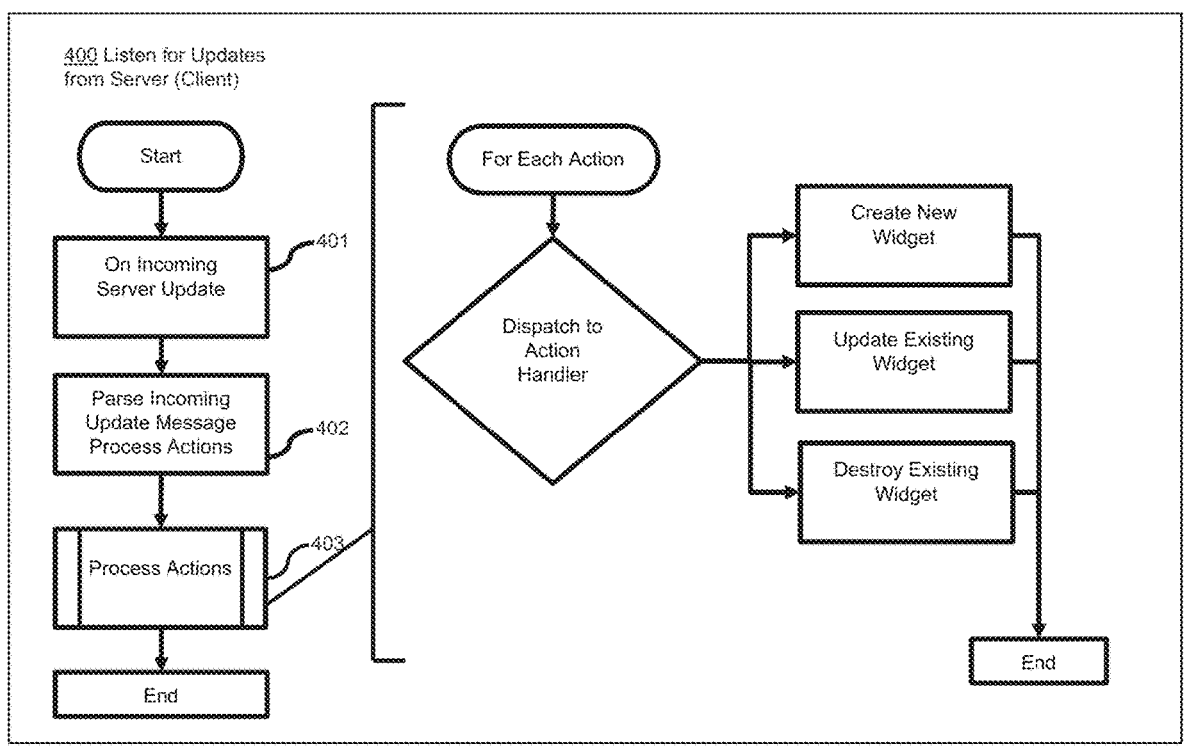
FIG. 10 shows an embodiment of a client listening for updates from a server.

As shown in FIG. 10, the client can Listen for Updates from Server 400. When in duplex communication mode, e.g. WebSocket, the server can initiate messages to the client, and the client can listen for incoming updates from the server (see 400—Listen for Updates from Server).

On Incoming Server Update 401, the client can be configured to process all updates received by the server on an incoming server update. The server can send updates to the client in server response to a client request. Alternatively, the server can send updates to the client "out of bound" (e.g. anytime, not requiring a client request) when the client and server are connected via a duplex connection, for example, a WebSocket connection.

The client can Parse Incoming Update Message 402 and generate from the update message, a list of actions for the client to execute.

The client can Process Actions 403, for example, by dispatching each action to an action handler associated with the action. Each action type can have an array of data packages. For example, each action type can be defined by a numeric index that corresponds to an action handler, for example, a JavaScript handler:

TABLE 9

0: None,
1: Initialization,
2: Create Component/Widget,
3: Update Component/Widget,
4: Destroy Component/Widget,
5: Evaluate Custom Script,
6: Return Value from Server Method,
7: Keep Alive Response,
8: Terminate Application,
9: Data Response,
10: Application Error/Exception.

The action dispatcher can implement a simple and fast computer execution loop that calls the action at the specified index (action type) passing to the handler the data array associated with the action.

For example, a "create widget" handler can create new widgets by iterating the data array and creating all the widgets according to the JSON definition received with the action request.

Similarly, an "update handler" can update existing widgets by iterating the data array and applying the new property values to the specific widgets according to the JSON definition received with the action request.

Similarly, a "destroy handler" can destroy existing widgets by iterating the data array and disposing (i.e. removing from the browser) the widgets targeted in the data array.

After processing each of the actions from the update message, the web application and the client widgets can be in-sync with their corresponding server components.

Benefits of the Real-Time Server and Client System and Methods

The tight integration between server objects and client widgets resulting from the system and methods disclosed herein provides several benefits over standard HTML or Client-Only Ajax systems.

Benefits include, for example, smaller data communications between client and server and smaller responses. When the client fires an ajax request it includes only the data specific for the event and only the differential state. HTML systems, instead, send back the complete state on each request and receive the entire page including data and HTML markup. Client-Only Ajax system need to pack in more data on each request because they don't have a corresponding component on the server side, in fact they usually don't have a server side other than decoupled web services.

Similarly, the methods and systems disclosed herein provide for full state preservation. Typically hitting refresh on the browser causes the loss of all the data that was not already submitted to the server. With Wisej, a browser refresh results in the complete and accurate restoration of the state at the moment of the refresh request.

Similarly, the methods and systems disclosed herein provide for safer deployments. Nothing related to the application's business logic, or visual logic, or workflow, or external resources is ever sent to the client, unlike in HTML and Client-Only Ajax systems.

Similarly, the methods and systems disclosed herein provide single-point authentication. Application startup and module access is entirely controlled by the server in a single Main startup method. There is simply no way to bypass the startup and use other pages, since there are no other pages, unlike HTML systems.

The server is able to push updates to any widget anywhere on the browser simply by sending an action request, resulting in real-time updates.

The server code is always in possession of the entire definition of all the client-side widgets and can modify the user view without requiring additional requests from the client. Because the server has full control, this results in a more stable web-application, without relying on a client request, cutting down on stutter and choppiness of the application. Furthermore, this allows for the modal execution flow, described in more detail below.

Finally, the server executes the application, while the client (browser or another device) executes the user interface (UI). All application-specific computations are always performed on the server, while all UI rendering is always executed on the client. This creates a clean separation of concerns, allowing for clearer, faster, and less-error prone development.

Server Side Modal Execution

The methods and techniques disclosed herein provides full server modal support, in a web application, which is a departure from the state of the art, as discussed earlier.

The term "modal frame," "modal window," "modal execution," "modal flow," "modal dialog" or "modal workflow" used herein, shall be understood to describe a user interface window, frame, component, or widget (for example, a messagebox window that pops up on the screen of a computing device) that must be closed or completed by the end user before other windows are allowed to receive any user input. In the context of a web browser application, this means that other client fields or widgets that are a part of the application will not be accessible by the user until the modal window is closed or completed.

Nested modal execution shall be understood to describe modal frames that create or are capable of creating additional modal frames on top of the preceding modal frame, such that the top modal frame must be closed or completed before the preceding modal frame can be accessed or receive user input.

Figure 11:
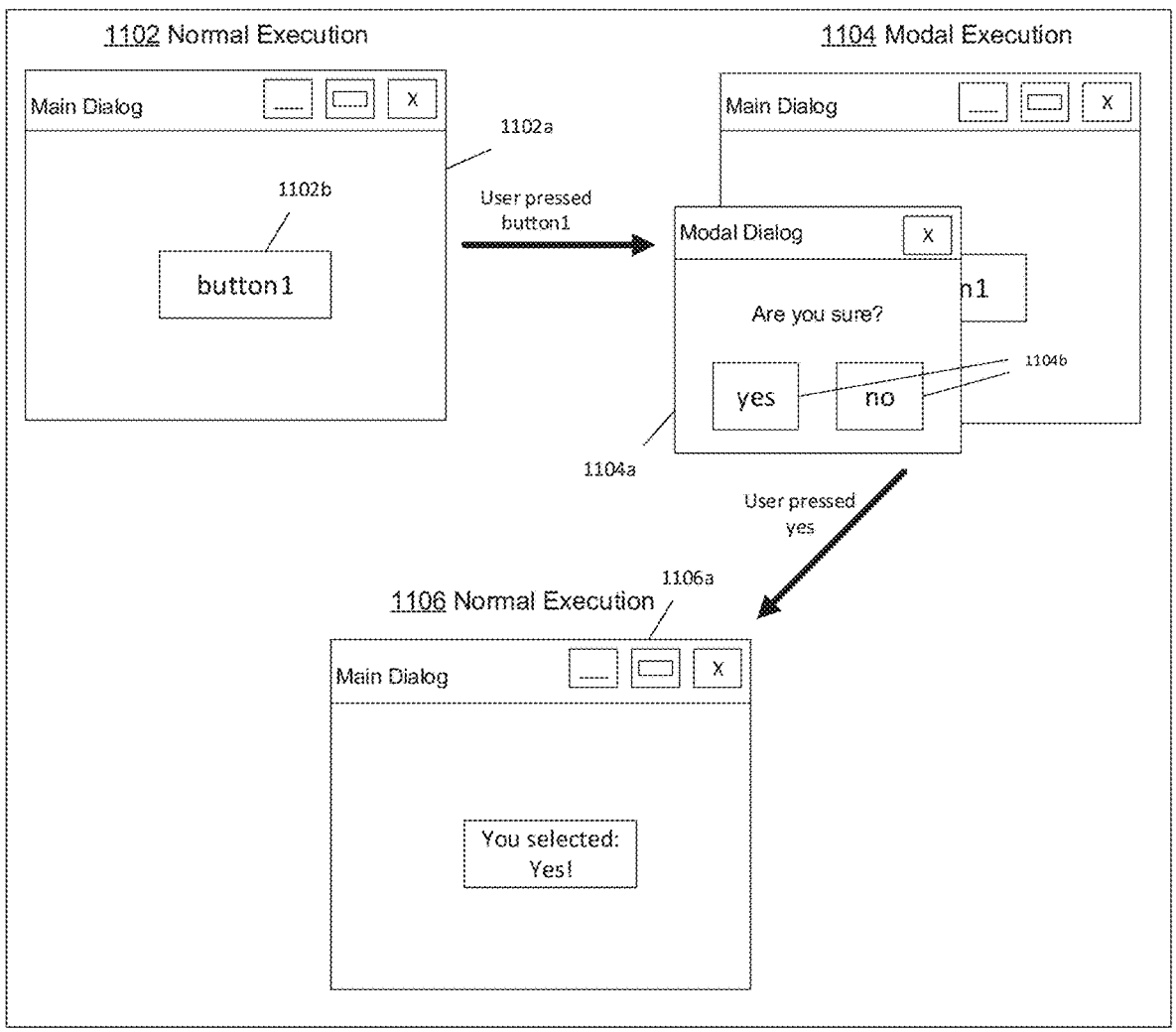
FIG. 11 shows an example of modal execution.

FIG. 11 shows a simple example of modal execution in an application. 1102 shows the web application in normal (non-modal) execution. The main window 1102a of the application, titled "SimpleModalFlowExample" can have a button, "button1" 1102b. When button 1102b is pressed, the application (and the underlying framework) can transition to modal execution 1104. Under modal execution, creates a modal dialog 1104a, in this case, a message box. The application and framework requires the user to enter input into the message box, blocking access to the main window. In this case, a User must click the "Yes" or "No" button 1104b to complete or exit the message box, before the User can access the main window of the application. After the user presses the "Yes" or "No" 1104b, the application can return to normal (non-modal) execution 1106 and allow the user access to the main window 1106a.

State of Art of Modal Execution in Web Applications

With the current web technologies, modal execution is done entirely on the client side using callbacks. The use of callbacks creates a complex interaction between the current context and the page that needs to be used in context. Nested modal frames further complicate development and can introduce unforeseeable bugs into the application, for example, when the state of a previous modal frame must be stored, and a newer modal frame depends upon information from previous modal frames.

If modal execution is initiated by the server, it becomes impossibly complex with traditional web development systems. In a scenario where the User selects an option on the client that triggers server-side processing, this can require additional user input. The server, under traditional web application frameworks, is incapable of suspending client execution, asking for more information, and proceeding. With traditional web application frameworks, the server must abort execution and return execution to the client, relying on the client to perform the correct steps.

For example, a user clicks on a "Save" button on a registration form application. The client sends a save request, the server starts processing the request and saves the data to a database (or an external service). At this point the server code (business logic on the server, or an external system unknown to the client) may decide that one field is either missing or invalid and needs the user to either rectify the missing or invalid data or confirm whether the change applied by the server is acceptable. The server, in this example, has no way to initiate any user interaction while it is processing a request. The server must abort the saving process and signal somehow to the client what the server needs the client to do. The traditional approach is to code this scenario, and related scenarios on the client, the code dictating how the client should behave due to the response from the server, to then determine whether the request was successful. The client code also carries the burden of anticipating what steps to perform if the request was successful. This client side code development becomes cumbersome in real life complex business applications. Web developers often have to re-architect the workflow completely to avoid situations like this.

These situations, however, are common in typical client/server desktop applications and are difficult to code in a typical web environment for the reasons above. The current framework provides a solution by providing the server control of the client user interface, and a duplex (e.g. WebSocket) connection. The server can popup a form or a request on the client at any time during any request and in any form with any number of fields, and maintains control of the client widgets, therefore overcoming the problem above.

Furthermore, the server side code related to the modal frames must be aware of the context, or state of the application. The modal frames must return data to the client depending on the context or state of the application; otherwise the return data can have, or should return the full data set bound to the page. For example, in the scenario above, if the server procedure that is responding to a request in a traditional web framework needs to send back data to the client, for example, a list of choices, the client code that receives the response must be able to process that response in the previous context (the request). If the user, for example, has a customer ID 234 along with dozens of additional fields (name, address, payment terms, and more) and then clicks "Save" the server needs to popup a box on the client asking for the Tax ID. In order to do that, the server must respond to the request (effectively terminating the request) and the client that was waiting for the response must have saved the full context of the request (client ID, name, etc.) in order to reissue the complete request with the missing data. The client code must therefore be written to save the full context of the request and wait for a response from the server or, instead, the client expects the server to return the full state.

The complexity grows as when developing for day to day usage of Line of Business (LOB) applications.

Methods and Systems of Modal Execution in a Web Application

The methods described herein provide full server-side modal support exactly as if the application was running on a desktop system, because the server maintains control of the application state through the control of the client widgets.

Server side code can interrupt the execution flow, ask for user input, interrupt again, ask for more user input, and so on. Each workflow frame can be stacked on a previous workflow frame. When the user closes, or otherwise terminates, the current modal dialog, the server can resume the previous suspended frame (the frame on top of the stack) with minimal developmental effort. For example, to develop a web application with the elements and functionality as shown in FIG. 11, the developer can accomplish this with the minimal code below:

TABLE 10

```
1    void button1_Click(object sender, EventArgs e){
2
3        if (MessageBox.Show("Are you sure?") == DialogResult.Yes){
4            this.button.BackColor = Color.Green;
5            this.button1.Text = "You selected: Yes!";
6        }
7    }
```

The minimal code shown above in Table 10 is in stark contrast to what would be required to building a web application with modal execution using existing frameworks.

The complexity of server-side modal execution in a web environment is because web applications are based on basic requests and responses: the browser issues a request, the server returns a response. The entire interaction between the client browser and the server is historically restricted to this narrow communication system.

Figure 12:
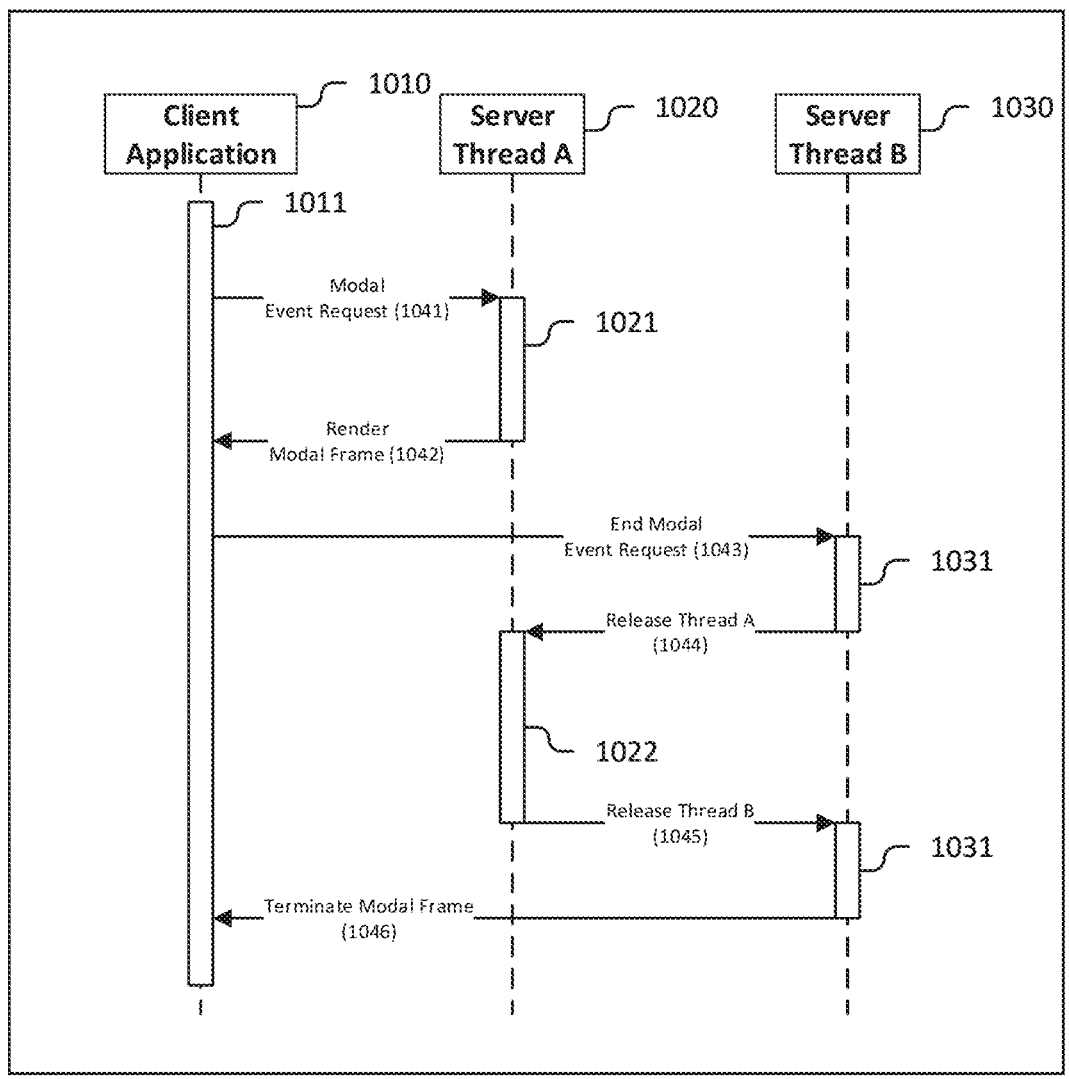
FIG. 12 shows an embodiment of a sequence diagram of modal execution.

An embodiment of the modal execution is shown in the FIG. 12, when a user triggers a modal event (i.e. an event that triggers modal execution) by doing something in a web application on the client 1011, the client can send a Modal Event Request 1041 to the server. The Modal Event Request 1041 can be a state and event request message, where an event within the message triggers modal execution. The server can then create a new thread, for example, Thread A 1020, to process the modal event request 1041 asynchronously.

Process 1021 of Thread A can include creating and updating server components, including creating a modal component, in response to the modal event request, dispatching each event to the corresponding handler, and sending a response to the client with instructions to create and update the corresponding modal widgets (i.e. sending the client the response message, Render Modal Frame 1042). In the case that a client request contains multiple modal requests, the framework can accommodate because the modal states are stacked. The second (or third, or Nth) thread that goes modal can wait and will be released by the server in the same order, similar to a computer desktop Windows operating system with multiple message boxes popped up- until the user terminates the topmost window, the user cannot interact with the one underneath.

In addition, process 1021 can mark the current modal frame as 'active' and store/push the current modal frame to a data structure, for example, to the top of a stack. Using a stack can be advantageous to organize the order of modal frames, therefore providing for nested modal execution, wherein the top of the stack represents the current modal frame displayed in the application and the bottom of the stack represents the bottom-most window of the application. Process 1021 can then suspend itself (and suspend execution of the handler) by sleeping and waiting for the modal window to terminate (e.g. for a user to satisfy the conditions to exit the modal frame). Thread A may, for example, wait until the modal frame is changed to 'deactivated' by checking at regular sleep intervals whether the modal frame it is associated with is still active, and only proceed when 'deactivated.'

The client 1011 can receive the server response, Render Modal Frame 1042, having instructions to update or create new widgets, with at least one of the new widgets being a modal frame (in the above example, the modal frame can be a message box window with a button). When a user terminates the frame, for example, by closing the frame or clicking on a button, the client can send an End Modal Event Request 1043, for example, in the form of a request message.

The server can create a new thread, Thread B 1030, for example, to process the End Modal Event Request 1043. Process 1031 can handle the End Modal Event Request by Release Thread A 1044, for example, by signaling Thread A to continue execution. The signal to Thread A can be in the form of changing the active modal window to deactivated. Thread B can then wait for Thread A to complete execution. Thread B can wait, for example, on a locked resource to become unlocked. Thread B can wait, in particular, on the modal window/component to be unlocked.

Upon release signal 1044, Thread A can resume at process 1022 by locking the modal window/component and executing the remaining handler instructions (e.g. instructions that remained in the handler prior to Thread A halting itself) from the Event Request 1041. Upon completion of execution of handler instructions (which can include changes to component properties), Thread A can Release Thread B 1045, for example, by unlocking the modal window/component. Thread A can then pop the modal component and terminate.

Upon release signal 1045, Thread B can resume at 1031 and pick up and send it back any component property changes (for example, executed by Thread A in 1022) to the client in a Terminate Modal Frame Response 1046.

Figure 13:
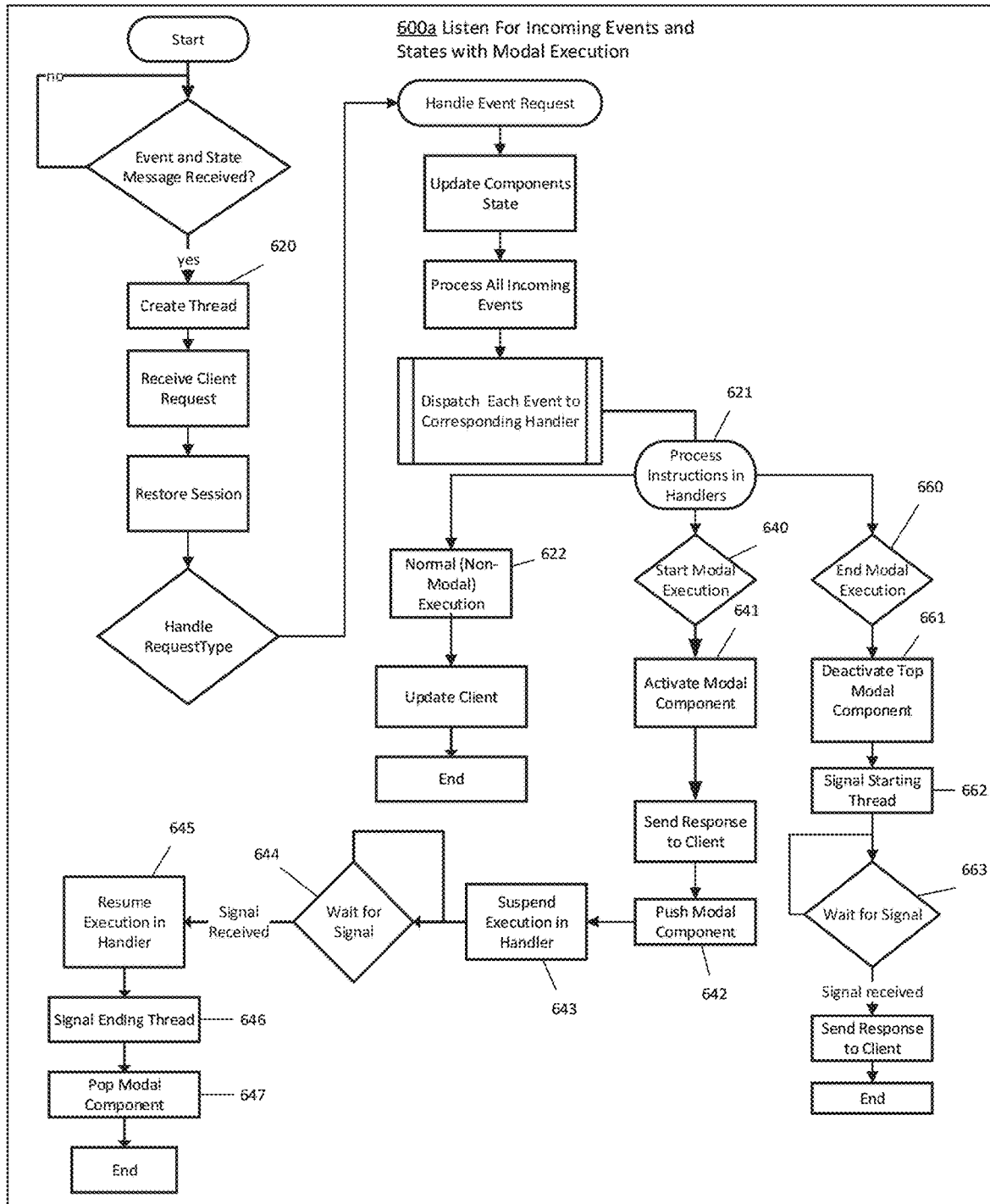
FIG. 13 shows an embodiment of modal execution as part of handling request messages.

FIG. 13 shows modal execution within the larger framework. The server can Listen for Incoming Events and States with Modal Execution 600a, where the server can receive a first request from a client.

The server can Create Thread 620, resulting in a first thread to process the client request asynchronously. After an event has been dispatched to the corresponding event handler, the thread can Processes Instructions in Handlers 621 within the event handler. If the event handlers do not contain instructions to Start Modal Execution 640 or End Modal Execution 660 then the first thread can perform Normal (Non-Modal) Execution 622 by processing each instruction in each handler, and then update the client. If the first thread comes across instructions to Start Modal Execution 640 (for example, to activate a message box), then it will begin modal execution.

The first thread can activate the modal component 641 by creating a new server component that visually represents modal execution, for example, a message box or a form. The first thread can then send the response to the client, with instructions to create a client widget corresponding to the modal component.

The first thread can then Push Modal Component 642, for example, the thread can push the newly created modal frame onto a stack, with the top-most item on the stack representing the top (i.e. active) modal frame in the application. A modal frame or frame, in this context is used to refer to a stacked data structure, e.g. the modal frame can be an object (data structure) saved to a stack (or Last In First Out LIFO structure). Each frame represents a thread in a modal state (waiting to the released). When the "endmodal" instruction comes in from the client, the server is agnostic to which frame the "endmodal" is referring to, rather the server can simply pop the top modal frame (which represents the active modal window and active modal frame).

To further illustrate, an "endmodal" is received by the server, for example, because the user closed the message box. The server "pops" the modal frame from the stack and changes a state in the modal frame for example, from "active" state to "deactivated" state. The thread that was suspended by that modal interruption can be implemented by continuously polling that modal frame state waiting for the state to be "deactivated" and once modal frame is popped and the state is changed "deactivated", the polling/waiting thread that can resume execution.

The first thread can Suspend Execution in Handler 643, by, for example, halting itself without executing further instructions from the request, and Waiting for Signal 644.

The first thread can Wait for Signal 644, for example, by entering a sleep loop and checking at regular intervals whether the modal frame it is associated with is still active. A modal frame is considered active, as discussed above, when the server creates the modal frame and pushes it on the stack. The thread that is blocked (in a modal state) keeps polling (checking a value in the modal frame) until the modal frame is popped and value is changed to deactivated.

Once the first thread receives a signal (for example, modal frame is deactivated by a second thread), the first thread can Resume Execution in Handler 645 by locking the modal component, executing any remaining instructions from the first request, which can include changes to component properties, resulting in changes to the user interface of the web application.

The first thread can Signal Ending Thread 646, where the first thread sends a signal to release a second thread, for example, by unlocking the modal component When a subsequent request is received, the server can create a second thread 620 to handle the subsequent request. The second thread can End Modal Execution 660. The second thread can Signal Starting Thread 661, for example, by deactivating the top modal component (the currently active modal frame). The second thread can then Wait for Signal 663, by waiting for the first thread to complete execution. An implementation of the waiting, for example, can be the second thread waiting for the top modal component to become unlocked by the first thread.

Once the second thread receives the signal, for example, top modal component becomes unlocked, the second thread can Send Response to Client 665, for example, by picking up any changes to the components, generating the corresponding changes to the client widgets, and package and send those changes in a response message to the client, as described in Update Client 500.

Benefits of Server Controlled Modal Execution

Being able to follow a logical workflow with the framework described herein, when writing code for LOB applications, provides several benefits.

The web application code is easier to maintain and extend. The framework allows the developer to write straightforward procedures not intertwined with asynchronous code branches. This helps make the application easier to understand later, and easier to maintain and extend. LOB applications tend to last for decades, unlike web sites that are generally disposable or frequently redesigned.

The vast majority of LOB applications are not web applications. The complexity of the data forms, multiple screens and modal levels, the large number of fields and complex rules, the tight integration with external systems (e.g. databases, middleware, services) makes it impractical to migrate or create LOB web applications, capable of being used by a browser. The framework provided herein supports the development of web-based LOB applications that can manage workflows of great complexity.

System for Providing Themes for Web Applications

The framework can include a theme system, the theme system providing support of self-contained theme files that can include: color map, font map, image map, styles and properties. The theme system can convert the self-contained theme file, for example, a JSON formatted theme file, at runtime and resolve the different resources and settings as the application runs.

The result is that an application using the framework described herein can change appearance and behavior (for example, images, colors and fonts) with a single file. Furthermore, the theming system can manipulate the theme on the client and the server side based on application specific logic. Such functionality is currently not supported by any web technology.

State of the Art of Web Application Theming Systems

Web application theming today is done either through code, or using CSS/CSS3 or enhancements to CSS such as SASS. These existing systems, however, result in CSS addressing the style of HTML elements and linking external resources. SASS, for example, is a preprocessor that converts a SCSS source file into a CSS file.

CSS, by design, applies only to HTML element styles and CSS is limited by the CSS specification, therefore a developer cannot add a custom property to CSS for the developer's application. For example, if a developer created an application and desired to add "orientation" as a property (i.e. vertical I horizontal) or alignment (left|top|right|bottom) CSS based themes do not support this. Furthermore, traditional web applications do not know have access to theme information (CSS file), for example, a traditional web application will know have access to the size or color of a specific element in the browser.

Implementation of a Theming System

The theming system provided herein we can easily read the theme information and determine everything the theme is doing to the widgets. And the theme system in with the disclosed framework is not limited to visual styles (colors, dimensions, shades), but the theme system includes theming of arbitrary properties (as can be tailored by a developer) that may affect the logic of widgets in ways that cannot be achieved just with CSS.

The system can include a single theme file containing everything needed (e.g., color definitions, fonts, images, styles and properties related to states) by an application to determine its theme and look and feel. The single theme file can have a format, for example, a JSON format.

The theming system can include consolidation, design, and extension of every aspect of a theme into a single theme file. The theme file can be converted at runtime into any format suitable for the client library (for example, a Qooxdoo library).

The theme file can define the following a name, settings, fonts, colors, images, and appearances as root sections. Table 11 shows an example of the theme file's root sections defined in JSON format:

TABLE 11

```
{
  "name": "MyTheme",
  "settings": { ... },
  "fonts" : { ... },
  "colors" : { ... },
  "images" : { ... },
  "appearances" : { ... },
}
```

The settings section can contain general system and application settings that can affect the look and feel (theming) of the application, for example, whether native scroll bars will be implemented, and what the frame padding widths should be:

TABLE 12

```
"settings": {
  "nativeScrollbars": true | false,
  "framePadding": [5,5,5,5]
}
```

The fonts section can define the font map that can be reused in the theme and by the application. The font map can be an indirection map. See the code snippet in Table 13 below, for example.

TABLE 13

```
"fonts": {
  "default": {
    "size": 13,
    "family": ["helvetica", "arial", "verdana", "sans-serif"]
  },
  "window-title": {
    "size": 16,
    "family": ["helvetica", "arial", "verdana", "sans-serif"],
    "bold": false
  },
  "dancing": {
      "size": 18,
    "family": ["dancing", "courier new"],
    "bold": false,
    "italic": false,
    "sources": [{
      "family": "Dancing",
      "source": [
  "http://fonts.gstatic.com/s/dancingscript/v7/DK0eTGXiZjN6yA8zAEyM2WrfpCc_r9-
  5ZnZPBmoO4Sk.eot",
  "http://fonts.gstatic.com/s/dancingscript/v7/DK0eTGXiZjN6yA8zAEyM2Ud0sm1ffa_JvZ
  xsF_BEwQk.woff2"
      ]
    }]
  },
}
```

The colors section can define a color map, or named colors that can be used reused in the theme or by the application. Table 14 shows the color map can be an indirection map, for example:

TABLE 14

```
"colors": {
    "activeBorder": "#3096D0",
    "activeCaption": "#3096D0",
    "activeCaptionText": "#FFFFFF",
    "appWorkspace": "black",
    "buttonFace": "#337AB7",
    "buttonText": "white",
    "buttonHighlight": "#28608F",
    "buttonShadow": "#7A7A7A",
    "buttonPressed": "#204073",
    "control": "#CDCDCD",
    "controlDark": "#B9B9B9",
    "controlLight": "#E5E5E5",
    "controlText": "#5F5F5F",
}
```

The images section can define an image map of named images that can be reused in the theme or by the application. Table 15 shows the image map can be an indirection map, for example:

TABLE 15

```
"images": {
    "baseUrl": "",
    "checkbox-checked": "data:image/svg+xml,base64,... ",
    "checkbox-undefined": "data:image/svg+xml,base64,... ",
    "checkbox": "images/checkbox.png"
}
```

The appearances section can define styles and properties grouped by key names and states. Each key name can be used by an application or by a widget to determine which styles or properties to use in relation to a state or a combination of states, as shown in Table 16:

TABLE 16

```
"appearances": {
    "button": {
        "states": {
            "default": {
                "properties": {
                    "opacity": 1,
                    "center": true,
                    "textColor": "buttonText",
                    "height": 26
                },
                "styles": {
                    "width": [1, 1, 1, 1],
                    "transition": "background-color 250ms",
                    "color": "rgba(0,0,0,0.2)",
                    "backgroundColor": "button Face",
                    "radius": [3, 3, 3, 3]
                }
            },
            "hovered": {
                "styles": {
                    "backgroundColor": "buttonHighlight"
                },
                "properties": {
                    "cursor": "pointer"
                }
            },
            "focused": {
                "styles": {
                    "color": "focusFrame"
                }
            },
```

TABLE 16-continued

```
            "disabled": {
                "properties": {
                    "opacity": 0.5,
                    "cursor": "default"
                }
            }
        }
    }
}
```

In Table 16, for example, button" is an appearance key name. The states are the first level names under "states": "default", "hovered", "focused", "disabled". A widget can be in multiple states, for example, it can be "disabled" and "hovered" at the same time if the widget is disabled and the user's mouse pointer is over the widget. Each state can contain a set of styles and properties that are applied to the widget when it matches the state.

The indirection map can associate a value to a name. The theming system resolves (i.e. converts the name to the corresponding value) during runtime on both the server and client side. Therefore, using the present framework, an application can "know" that the color "buttonText" is defined as "#050505" in the current theme file, which is not supported or practical with existing frameworks. The theming system allows the developer of a web application to set a color of a widget/component to "buttonText" and the theming system will determine and render the application during run-time based on the loaded theme file.

The appearance section can contain more complexity than the other sections because it can define styles and properties grouped in states, the states can be grouped in components, the components can be grouped in appearance keys.

The theming system can include a theming engine that applies the styles and properties to a widget depending on the current run-time state of the widget. For example, a button can have the state "pushed" or "hovered" or "disabled," each state can own a unique set of properties and styles. The theming engine can be part of a widget library, for example, Qooxdoo. The framework/middleware includes a theme translator that takes the theme definition (e.g. a JSON definition) and translates it into structures and code that can be used by the theming engine. The theme definition is agnostic to the type of widget library to be used, meaning the definition would remain unchanged if the widget library was changed, however, the framework translator can then translate the theme definition differently to accommodate the widget library.

Styles and properties apply to widgets. However, the application can use information in the theme and apply it to non-widget elements if necessary.

Furthermore, if a widget has multiple states, the theming engine can apply the styles and properties in sequence for all matching states. Therefore, a button with "hovered" and "pressed" states can receive the styles and properties defined for both states in order of declaration.

Styles are values that are applied to the entire widget using the CSS class system. A style applied to the "button" appearance in the pushed state can be relevant or applied to all widgets that use the "button" appearance. The setting is converted to a CSS class that applies to all buttons that use that class.

For example, "button/pushed/styles/radius:3" generates a CSS class "button-pushed" with the style value "border-radius" of 3 which applies to all buttons in the pushed state.

Properties are different than styles. A property setting in the theme is a value that is assigned to a widget property with the same name and can be overridden in a specific widget instance.

For example, "button/pushed/properties/radius:3" doesn't generate any CSS class, it assigns the value 3 to the "radius" property of any widget that uses the appearance "button". The value can be different in each widget instance since the application can set property values on each widget. This is the main difference between styles and properties.

Each appearance node can contain child appearances that are limited in scope to the child widgets of the widget using the parent appearance.

For example, if a button widget using the "button" appearance contains a child icon widget using the "icon" appearance, the appearance "appearances/button" applies to the button and the appearance "appearances/icon" applies to the icon.

However, "appearances/icon" applies to all icons in the application. The system can define a child appearance for the icon, the child appearance theme applying only to children of the parent, therefore creating a uniform theme for children icons of the parent button that can be different than other icons in the application. See Table 17, for example:

TABLE 17

```
"button": {
    "components": {
        "icon": {
            "inherit": "icon",
            "states": {
                "default": {
                    "properties": {
                        "width": 32,
                        "height": 32
                    }
                }
            }
        }
    }
}
```

Child appearances allow a theme to inherit and modify the appearance of a widget only when it is inside another widget following the parent-child tree. In Table 17, for example, the children are inheriting the "icon" appearance and modifying only the width and height.

The client can implement the themed file during runtime. The client middleware, having a theme translator (as discussed earlier) can convert the theme file, (for example, a JSON formatted theme file) into computer executable code, for example, JavaScript dynamic code, that can used/executed by the client, for example, through a client framework such as Qooxdoo. The system and methods are agnostic with regard to the client framework, however, because the theming system can utilize different formats to be used by the client framework.

On the server side, the theming system provides an interface for developers to read and resolve the current theme. For example, the server may be configured to respond to values stored in a property in a theme. The application may change the theme during run-time. Therefore, the server must be able to read and resolve the theme during run-time to respond to changed values.

Benefits of the Theming System

The theme system described herein compared to existing theming systems provides the following benefits:

A single self-contained file avoids breaking external dependencies when changing a theme, allows an application to deploy a theme without interfering with external resources, and allows a theme to be relocated without having to copy or relocate dozens of external resource files.

The organization of the file allows for the server to determine and pinpoint what value would a widget use from the theme in relation to a specific state. The definitions and formatting, therefore, allows the theme to be usable by server code as well as client code. Traditionally, all themes are client side only, and in CSS. Under plain CSS, it would be impossible or impracticable for the server code to parse the CSS and apply the rules to make final determinations such as changing widget states, color, or more.

The indirection of resources (e.g. images, colors, font maps) allows an application to use nominal values in the current theme and never having a dependency on a specific value.

Custom properties not limited by CSS allow a theme, widgets and components to adapt their behavior, layout and look & feel in ways that are currently impossible with plain CSS.

System and Methods for a Pixel Perfect Designer

The systems and methods disclosed herein render a web application during development in a manner that will perfectly match how the client browser will render it during run-time.

The framework includes providing a pixel perfect designer that allows developers to build web applications using the server components and client widgets by dragging and dropping components on a designable surface, for example, the display area of a designer or integrated development environment (IDE). The designer techniques and methods can be implemented in anIDE, for example, Microsoft Visual Studio, SharpDevelop or other .NET Winform designer. However, the system and techniques disclosed herein can work with any IDE that can design a user interface (UI).

State of the Art of Pixel Perfect Designers

Existing designers built in developer tools such as Visual Studio, Eclipse, and others typically use two different approaches to display a web application to a developer during design-time (i.e. while they are developing the application, not during run-time in a browser):

Existing web application designers use visual approximation. They create designable objects that show basic information about the visual element and approximate their aspect and location.

Figure 14:
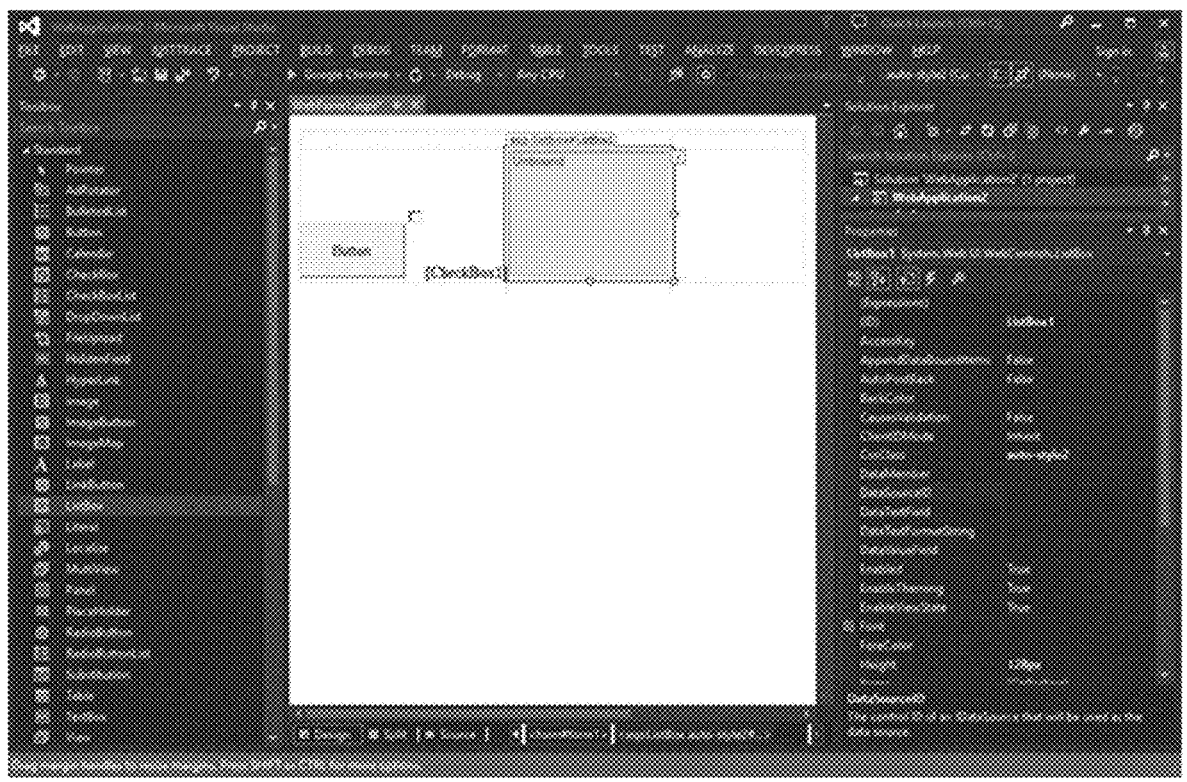
FIG. 14 shows an HTML based designer.

Existing web application designers can also utilize HTML based designers. The HTML designer is based on a browser and shows and manipulates directly the HTML result. See FIG. 14 for an example of an HTML based designer.

Methods and Systems of a Pixel Perfect Designer

The designer, as part of the framework herein, uses a novel solution directed towards displaying, during design-time, an accurate representation of a web application as it would be rendered during run-time by a client browser.

The system can include the following: a designer (or Integrated Developing Environment), one or more controls (i.e. a server component with a visual representation), and one or more image renderers, for example, a rendering engine (also known as a layout engine or a web browser engine).

The components or components can have at least one graphical component. Properties can be defined within the controls or components, the properties enabling the image renderer to render a corresponding image file of the component, as the corresponding widget would be rendered during runtime by a client.

The image renderer can be a computer based system configured to render marked up content (for example, HTML, XML, image files, and more) and format information (for example, CSS, XSL, and more). The image renderer can be an HTML renderer or a rendering engine or an inner browser configured to receive a defined set of properties and render a digital image (for example, a bitmap image) based upon the defined set of properties. An HTML renderer and rendering engine will be understood to mean the same thing for the purpose of this disclosure.

The image renderer can be configured to have a method, for example, a JavaScript method, capable of being invoked by a designer. The method can receive (as inputs) properties of a control, for example, a unique identifier and class name for a corresponding widget in an application. Properties of a control depend on the particular control and the corresponding widget. The minimum set includes the id, class name, x, y, width, height. Additionally, each control has its own set of properties, i.e. text, orientation, autoScroll, maximizable, movable, resizable, and more. The properties of the control can be defined in terms of client widget properties, corresponding to the control, where the control is a server component. The properties can be formatted in JSON definition.

Providing formatting in JSON is found to be advantageous due to the JSON data can be converted by the client to a JavaScript object very quickly without any additional code. Similarly, the server can parse a JSON string (coming from the client) into a map very efficiently. Furthermore, with JSON formatting, there is virtually no limit in size. For example, the server can send to the client something like this "{"name":"test"}". The client middleware can convert that string very quickly into an object, for example: var name=obj.name. Other formats, for example, XML or a custom message format, may also be implemented; however, this could add complexity and slow the performance of the application.

Figure 15:
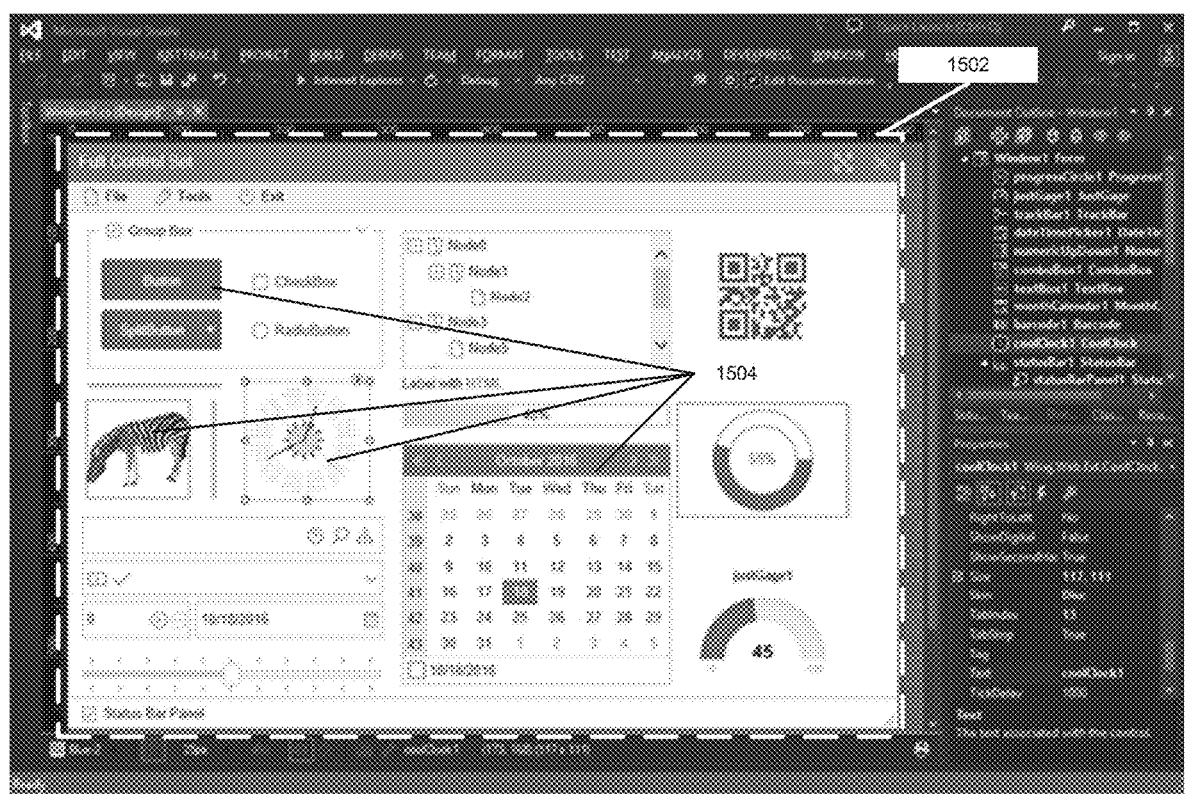
FIG. 15 shows an embodiment of a pixel perfect designer during design time.
Figure 16:
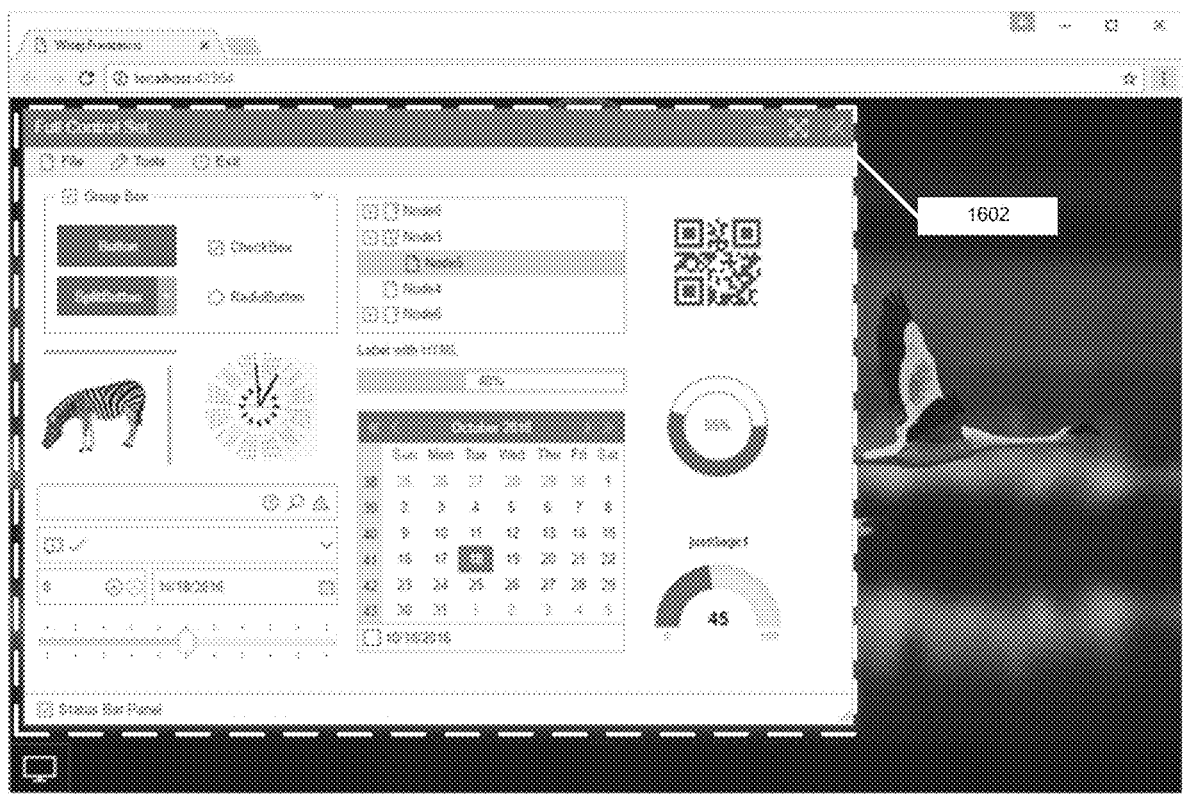
FIG. 16 shows an embodiment of an application during runtime, the same application being designed in FIG. 15.

The designer can be an Integrated Development Environment (IDE), for example, Visual Studio, SharpDevelop, or other .NET Winform designers. As shown in FIG. 15, the designer can have a display area 1502 configured to display a graphical representation of the web application during design-time and without compiling the web application or running the web application in a client. The designer can be configured to call the image renderer, during design-time and without running the web application in a client (including on a local client), to generate at least one digital image of the at least one control/component/widget and display the digital images 1504 in the display area 1502. The web application in the display area 1502 during design-time matches the same web application in the browser 1602 (run-time) as shown in FIG. 16.

The designer can be a can use the existing Visual Studio WinForms designer with "hollow" controls "filled" with the bitmap image coming from the rendering of the control's properties performed by a pool of web browsers in memory.

In order to preserve speed and responsiveness, the previously generated bitmap can be cached and used (and scaled as necessary) while the renderer creates a new image in parallel.

When a control changes any of its visual properties, the system can invalidate the display area, queue a new render request with along with the new visual property values, and releases control.

When the rendering is done, the renderer can invalidate the control again and provide the newly generated content.

Rendering requests can be queued and executed asynchronously after a small delay to minimize overloading the renderer with a "train" of changes (i.e. rapid changes to the same property), such as a quick resize of the control. When a control requests a new rendering operation, the system can search the queue to see if the control is still waiting for a previous rendering request, and updates the rendering properties associated with the previous request without losing the priority in the rendering queue.

If a control is still waiting for a previous rendering request, the system updates the values of the pending request to avoid multiple renderings. For example, if a control is waiting to be rendered when its dimensions were 20×20 when the user resizes the control in the designer to 30×30, there is no point in rendering it 20×20 and then 30×30. So the system finds that there is a pending 20×20 request and updates it so that only one final rendering is executed.

If the control is not waiting for any pending rending, then a new rendering request is queued.

Figure 17:
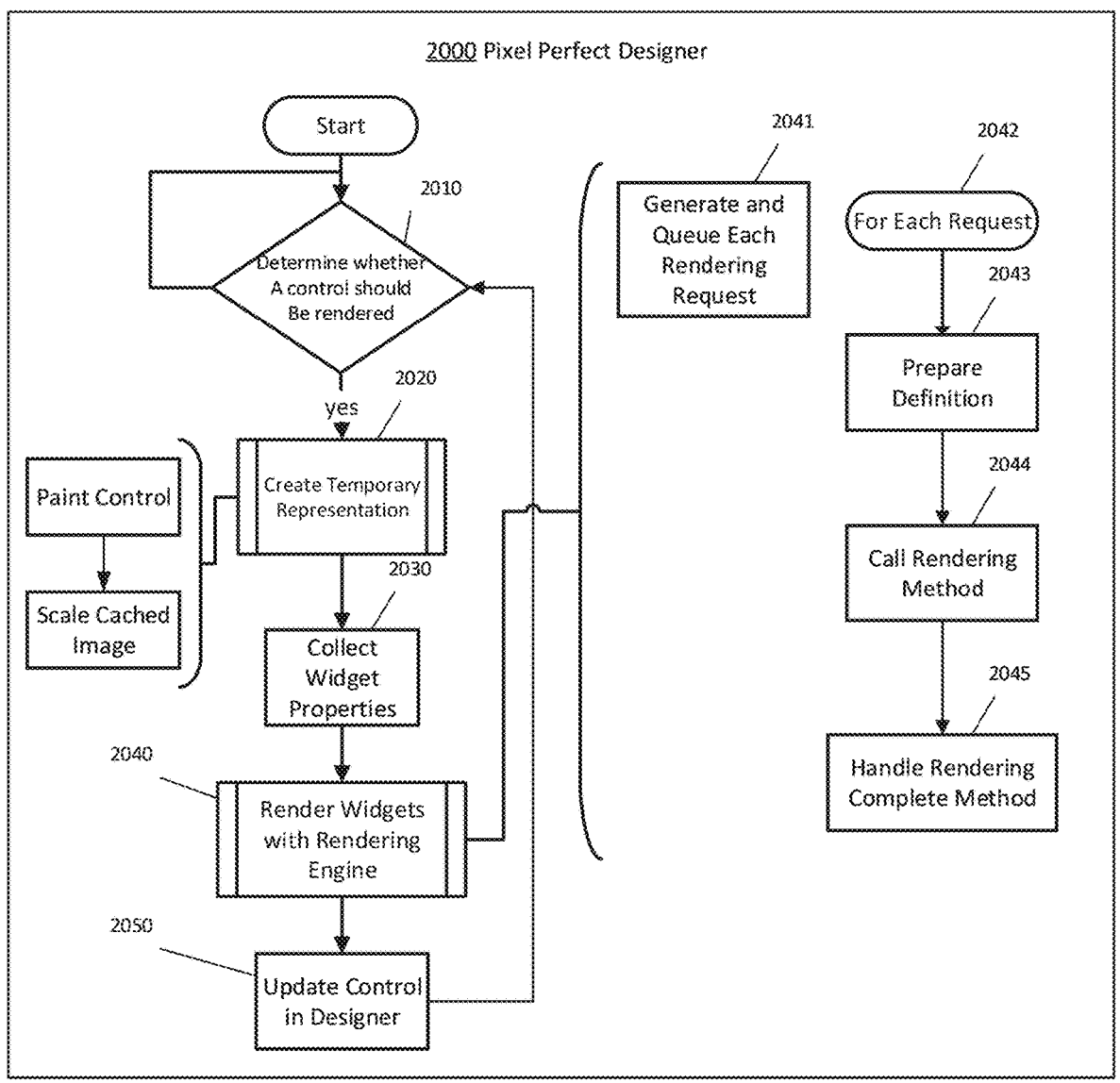
FIG. 17 shows an embodiment of implementation of a pixel perfect designer.

As shown in FIG. 17, the system can Determine Whether a Control Should Be Rendered 2010, for example, by waiting for a user to drag and drop a control into the web application (i.e. the front end or user interface portion of the web application) in the design window or when a user changes the visual properties of an existing control in the web application.

The system can Create Temporary Representation 2020 of the new or changed control. The system can Paint Control 2021, for example, by generating a request to paint the control, for example, a WM_PAINT or a WM_NCPAINT request message. The system can then extract all the parameters necessary to paint the control from the request. For example, the system may Paint Control 2021 by, passing the generated request message to a control, the control being configured (pre-configured) to handle the message by drawing (painting) the control's graphical representation to the device context (DC) provided by the request message. The device context can be the screen or display area of the designer. The graphical representation may be an image saved to cache by the system.

The system can then Scale Cached Image 2021, by immediately scaling the cached image to match the control's dimension and update the screen. The image can get skewed giving a temporary stretched effect to the control.

The system can Collect Widget Properties 2030. For example, the system can command the control to generate all the properties that would go to the client if the system was not running in design mode (less some runtime-only properties), for example, by gathering the widget properties through the control's rendering method.

The system can Render Widgets with Rendering Engine 2040. The system can perform the rendering asynchronously. For example, the system can Generate and Queue a Rendering Request 2041 for each control being rendered. The data associated with the request can include all the widget properties and the unique id associated with the control.

The rendering queue can be processed asynchronously at a small delay, to let the designer system queue several rendering requests and/or update already pending requests. The delay depends on the image renderer used for the rendering. The designer or system can queue the requests and release control. When the image renderer (internal browser) is ready it "pulls" the next rendering task and then signals that it done rendering, again asynchronously. When wisej receives the "render" event from the renderer, it grabs the bitmap representation and sends the next task in the rendering queue, and then waits again for the next "render" event. It's all asynch.

For Each Request 2042 that is in the rendering queue, a rendering processor can pick each request from the rendering queue and pass them to an active image renderer.

The rendering processor can Prepare Definition 2043, by preparing the rendering requests definition and formatting the definition, describing all the properties of the control that has to be rendered on screen. The formatting can result in a JSON definition.

The rendering processor can Call Rendering Method 2044. The rendering method can be a method within the image renderer. The method can be a JavaScript method. The method can be preloaded or designed into the image renderer to receive the full definition of the widget, for example, a JSON definition. The designer can invoke the method preloaded in the image renderer, passing the full definition of the widget, and yielding back. Upon invoking the method, the image renderer can render an image in computer memory, for example a bitmap, the image based on the definition, and being a graphical representation of the widget corresponding to the rendered component. The definition may contain properties, for example, at a minimum, a class name.

In other words, once the designed sends the widget definition to the renderer, the designer is done. When the renderer has rendered the image, the renderer can fire an event back to the designer. The event handler in the designer will match the incoming bitmap representation with the corresponding rendering request and control.

The system can Handle Rendering Complete Event 2045. The system can include a "Rendering Complete" handler. When the image renderer has completed the rendering of the image, it can fire a "Rendering Complete" event. The handler for the "Rendering Complete" event can retrieve the image of the widget as rendered in memory and notify the designer.

The designer can Update Control in Designer 2050. The designer can receive the notification along with the rendered image and update or display the image on screen, in the designer display area.

Figure 18:
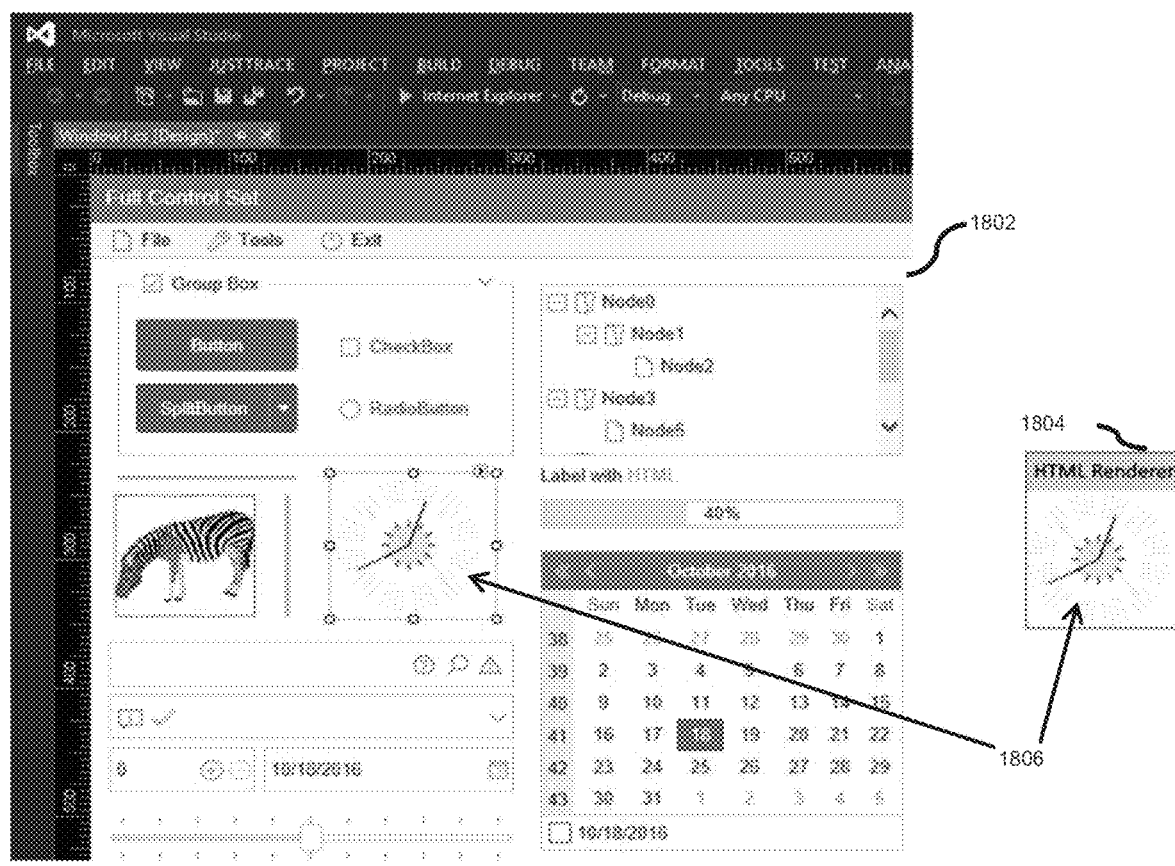
FIG. 18 shows an embodiment of an image renderer and designer during design-time.

FIG. 18 shows the relation between the designer's display area 1802, the image renderer 1804 and the rendered image 1806.

Benefits of the Pixel Perfect Designer

The usage of a fully functional image renderer to create the bitmaps to use at design time on a fully functional designer provides the following major benefits over existing HTML designers:

The system provides limitless rendering of controls. The image displayed in the designer is the result of the complete execution and rendering of a fully functional client widget (for example, a JavaScript widget) as it would look if it was running in a real browser, allowing the system to render controls of any complexity at design time.

The system provides Pixel-Perfect display. In other words, there is no difference between the runtime and design time rendering of widgets providing unparalleled accuracy to developers working with the designer.

The system provides reliability. Decoupling the designer from the renderer protects the designer from problems with the HTML rendering or processing operations. Any problem that prevents the HTML renderer from completing the task can be handled without compromising the designer surface. Existing HTML-based designers don't have this separation and are vulnerable to inherent problems associated with complex HTML processing.

Figure 20:
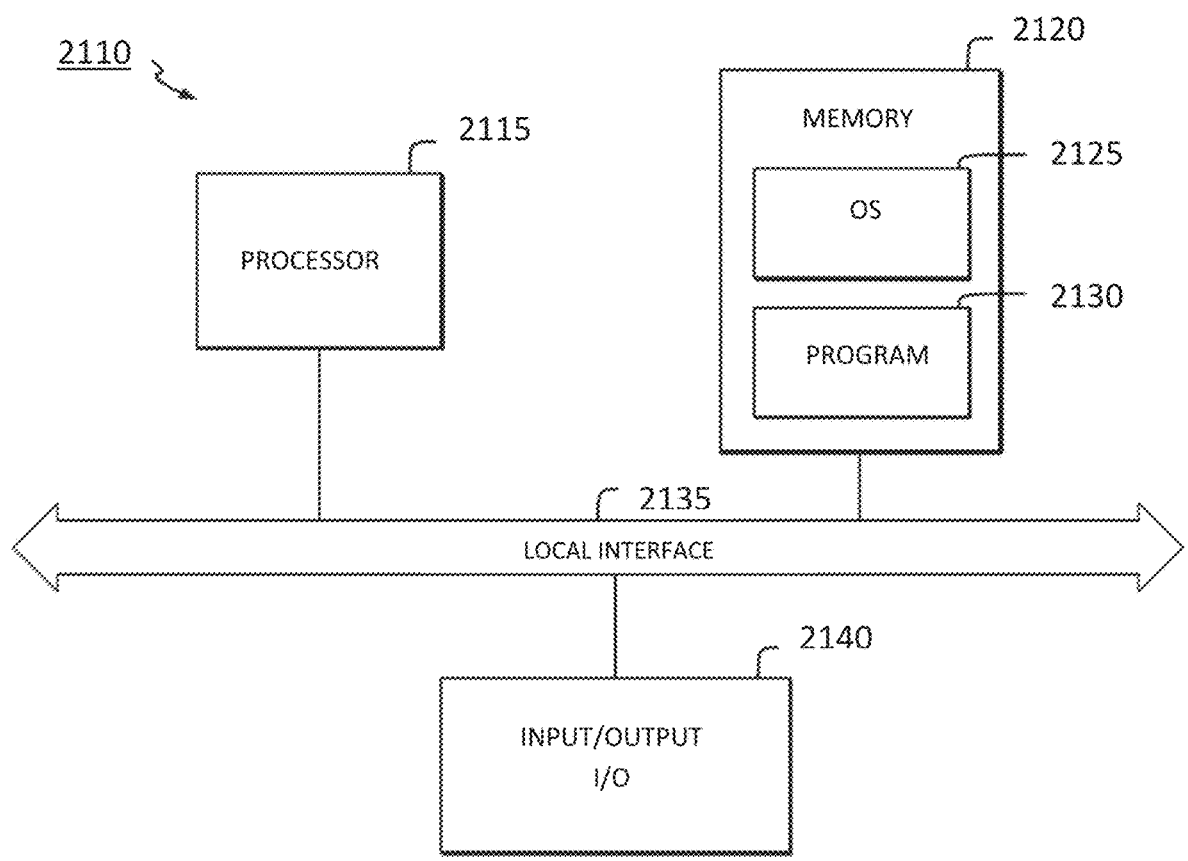
FIG. 20 shows an embodiment of a computer system.

FIG. 20 is an exemplary embodiment of a target hardware (2110) (e.g., a computer system) for implementing the embodiment of FIGS. 1-19. This target hardware comprises a processor (2115), a memory bank (2120), a local interface bus (2135) and one or more Input/Output devices (2140). The processor may execute one or more instructions related to the implementation of FIGS. 1-19 and as provided by the Operating System (2125) based on some executable program (2130) stored in the memory (2120). These instructions are carried to the processor (2115) via the local interface (2135) and as dictated by some data interface protocol specific to the local interface and the processor (2115). It should be noted that the local interface (2135) is a symbolic representation of several elements such as controllers, buffers (caches), drivers, repeaters and receivers that are generally directed at providing address, control, and/or data connections between multiple elements of a processor based system.

In some embodiments, the processor (2115) may be fitted with some local memory (cache) where it can store some of the instructions to be performed for some added execution speed. Execution of the instructions by the processor may require usage of some input/output device (2140), such as inputting data from a file stored on a hard disk, inputting commands from a keyboard, inputting data and/or commands from a touchscreen, outputting data to a display, or outputting data to a USB flash drive. In some embodiments, the operating system (2125) facilitates these tasks by being the central element to gathering the various data and instructions required for the execution of the program and provide these to the microprocessor.

In some embodiments, the operating system may not exist, and all the tasks are under direct control of the processor (2115), although the basic architecture of the target hardware device (2110) will remain the same as depicted in FIG. 20. In some embodiments, a plurality of processors may be used in a parallel configuration for added execution speed. In such a case, the executable program may be specifically tailored to a parallel execution. Also, in some embodiments the processor (2115) may execute part of the implementation of FIGS. 1-19 and some other part may be implemented using dedicated hardware/firmware placed at an Input/Output location accessible by the target hardware (2110) via local interface (2135). The target hardware (2110) may include a plurality of executable programs (2130), wherein each may run independently or in combination with one another.

A number of embodiments of the disclosure have been described. Nevertheless, it will be understood that various modifications can be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The invention claimed is:

1. A method of providing a dynamic, customizable theming system for a web application comprising:
    creating a theme file, the theme file being a single file and not multiple combined files;
    defining in the theme file, a theme name, settings, fonts, colors, images and appearances; and
    converting the theme file into a dynamic code that is executed by a client during run-time of the web application;
    wherein:
        the settings comprises general system and application specific information including whether or not scrollbars will be displayed and frame padding widths,
        the fonts comprises an indirection map, mapping differently named fonts to sets of font information,
        the colors comprises an indirection map, mapping named colors to specific colors that the client may use to draw the named colors,
        the images defines named images that can be reused in the theme file or web application, mapping named images to defined image sources,
        the appearances define styles and properties grouped by key names and states, each key name capable of reuse by the web application or widget to determine which styles or properties to use in relation to a state or combination of states, the styles being values that apply to entire widgets using a CSS class system, properties being values that are assigned to a widget property with the same name and capable of being overridden in a specific widget instance, and
        each appearance of the appearances is capable of being a parent appearance, the parent appearance containing child appearances, the child appearances limited in scope to the child widgets of a widget using the parent appearance.

2. The method of claim 1, wherein the theme file is in JavaScript Object Notation (JSON) format.

3. The method of claim 1, wherein the dynamic code is in JavaScript.

4. The method of claim 1, wherein the font information comprises one or more of font type, font size, bold, italic, and url source information.

5. The method of claim 1, wherein the font information comprises font type, font size, bold, italic, and url source information.

* * * * *